US010270579B2

United States Patent
Chendamarai Kannan et al.

(10) Patent No.: US 10,270,579 B2
(45) Date of Patent: Apr. 23, 2019

(54) EFFICIENT ACK/NACK TRANSMISSION

(71) Applicant: QUALCOMM Incorporated, San Diego, CA (US)

(72) Inventors: Arumugam Chendamarai Kannan, San Diego, CA (US); Taesang Yoo, Riverside, CA (US); Siddhartha Mallik, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 15/012,560

(22) Filed: Feb. 1, 2016

(65) Prior Publication Data

US 2016/0233999 A1 Aug. 11, 2016

Related U.S. Application Data

(60) Provisional application No. 62/112,310, filed on Feb. 5, 2015.

(51) Int. Cl.
*H04L 1/00* (2006.01)
*H04L 1/16* (2006.01)
(Continued)

(52) U.S. Cl.
CPC .......... *H04L 5/0055* (2013.01); *H04L 1/1607* (2013.01); *H04L 1/1621* (2013.01);
(Continued)

(58) Field of Classification Search
None
See application file for complete search history.

(56) References Cited

U.S. PATENT DOCUMENTS

2009/0241004 A1* 9/2009 Ahn ................. H04L 1/1812
714/749
2012/0039280 A1 2/2012 Chen et al.
(Continued)

FOREIGN PATENT DOCUMENTS

WO WO-2010005712 A1 1/2010
WO WO-2011041623 A1 4/2011

OTHER PUBLICATIONS

ISA/EPO, Partial International Search Report of the International Searching Authority, Int'l. App. No. PCT/US2016/016084, Apr. 19, 2016, European Patent Office, Rijswijk, NL, 8 pgs.
(Continued)

*Primary Examiner* — Jutai Kao
(74) *Attorney, Agent, or Firm* — Holland & Hart LLP

(57) ABSTRACT

Methods, systems, and devices are described for wireless communication. Wireless devices may exchange data using Medium Access Control (MAC) layer units known as transport blocks which may include a number of code blocks (CBs). A receiving device may attempt to decode each CB and send acknowledgement (ACK) and negative-acknowledgment (NACK) feedback to the transmitting device based on the whether each CB was successfully decoded. The receiving device may determine a format from two or more available formats for transmitting the ACK/NACK feedback. The format for the ACK/NACK feedback may be determined based at least in part on a number of CBs received and a number of CBs that have a NACK feedback. ACK/NACK feedback may be provided on an individual CB basis, or for bundles of CBs. The transmitting device may perform blind decoding of the received feedback to determine the ACK/NACK format and CBs that have NACK feedback.

64 Claims, 16 Drawing Sheets

(51) Int. Cl.
      *H04L 1/18*       (2006.01)
      *H04L 5/00*       (2006.01)
      *H04W 72/04*      (2009.01)

(52) U.S. Cl.
      CPC .......... *H04L 1/1671* (2013.01); *H04L 1/1809* (2013.01); *H04L 1/1861* (2013.01); *H04W 72/044* (2013.01); *H04W 72/0406* (2013.01); *H04L 1/0073* (2013.01)

(56) References Cited

U.S. PATENT DOCUMENTS

| | | | |
|---|---|---|---|
| 2013/0176920 A1* | 7/2013 | Seo | H04L 1/1861 370/280 |
| 2014/0133341 A1 | 5/2014 | Meyer et al. | |
| 2017/0111156 A1* | 4/2017 | Guan | H04L 5/0055 |

OTHER PUBLICATIONS

ISA/EPO, International Search Report and Written Opinion of the International Searching Authority, Int'l. App. No. PCT/US2016/016084, dated Jul. 18, 2016, European Patent Office, Rijswijk, NL, 18 pgs.

* cited by examiner

EFFICIENT ACK/NACK TRANSMISSION

CROSS REFERENCES

The present application for patent claims priority to U.S. Provisional Patent Application No. 62/112,310 by Chendamarai Kannan et al., entitled "Efficient ACK/NACK Transmission," filed Feb. 5, 2015, assigned to the assignee hereof.

BACKGROUND

Field of the Disclosure

The following relates generally to wireless communication, and more specifically to code block (CB) level hybrid automatic repeat request (HARD).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In some wireless communications systems, wireless devices may exchange data using Medium Access Control (MAC) layer units known as transport blocks. A receiving device may process the transport blocks and send acknowledgement information to the base station regarding their status. If a transport block is corrupt, the transmitting device may retransmit the entire transport block. However, in some instances only a portion of a transport block may be corrupt. Thus, retransmitting entire transport blocks may decrease system performance.

SUMMARY

Systems, methods, and apparatuses for code block (CB) level hybrid automatic repeat request (HARQ) are described. Wireless devices may exchange data using Medium Access Control (MAC) layer units known as transport blocks that may include a number of CBs. A receiving device may attempt to decode each CB and send acknowledgement (ACK) and negative-acknowledgment (NACK) feedback to the transmitting device based on whether each CB was successfully decoded. The receiving device may determine a format from two or more available formats for transmitting the ACK/NACK feedback. The format for the ACK/NACK feedback may be determined based at least in part on a number of CBs received and a number of CBs that have a NACK feedback. The format for the ACK/NACK feedback may comprise a compression scheme, a bundling scheme, or a combination thereof. ACK/NACK feedback may be provided on an individual CB basis, or for bundles of CBs, for example. The transmitting device may perform blind decoding of the received feedback to determine the ACK/NACK format and CBs that have NACK feedback.

A method of wireless communication at a wireless device is described. The method may include receiving a plurality of code blocks (CBs) in a received transmission, determining hybrid automatic repeat request (HARQ) acknowledgment/negative acknowledgment (ACK/NACK) feedback for each CB of the plurality of CBs, identifying a format, from two or more available formats, for transmitting the HARQ ACK/NACK feedback, and transmitting the HARQ ACK/NACK feedback using the identified format.

An apparatus for wireless communication at a wireless device is described. The apparatus may include means for receiving a plurality of code blocks (CBs) in a received transmission, means for determining hybrid automatic repeat request (HARQ) acknowledgment/negative acknowledgment (ACK/NACK) feedback for each CB of the plurality of CBs, means for identifying a format, from two or more available formats, for transmitting the HARQ ACK/NACK feedback, and means for transmitting the HARQ ACK/NACK feedback using the identified format.

A further apparatus for wireless communication at a wireless device is described. The apparatus may include a processor, memory in electronic communication with the processor, and instructions stored in the memory, wherein the instructions are executable by the processor to receive a plurality of code blocks (CBs) in a received transmission, determine hybrid automatic repeat request (HARQ) acknowledgment/negative acknowledgment (ACK/NACK) feedback for each CB of the plurality of CBs, identify a format, from two or more available formats, for transmitting the HARQ ACK/NACK feedback, and transmit the HARQ ACK/NACK feedback using the identified format.

A non-transitory computer-readable medium storing code for wireless communication at a wireless device is described. The code may include instructions executable to receive a plurality of code blocks (CBs) in a received transmission, determine hybrid automatic repeat request (HARQ) acknowledgment/negative acknowledgment (ACK/NACK) feedback for each CB of the plurality of CBs, identify a format, from two or more available formats, for transmitting the HARQ ACK/NACK feedback, and transmit the HARQ ACK/NACK feedback using the identified format.

In some examples of the method, apparatuses, or non-transitory computer-readable medium described above, identifying the format for transmitting the HARQ ACK/NACK feedback comprises determining a number of NACKs for the plurality of CBs, determining a number of CBs in the plurality of CBs, and identifying the format for transmitting the HARQ ACK/NACK feedback based at least in part on the number of NACKs and the number of CBs. In some examples, identifying the format is based on the HARQ ACK/NACK feedback. Additionally or alternatively, in some examples the two or more available formats comprise an uncompressed format and one or more compressed formats.

In some examples of the method, apparatuses, or non-transitory computer-readable medium described above, the uncompressed format is identified as the format for transmitting the HARQ ACK/NACK feedback when the number of CBs is less than a threshold number of CBs, and wherein one of the one or more compressed format is identified as the format for transmitting the HARQ ACK/NACK feedback when the number of CBs meets or exceeds the threshold number of CBs. Additionally or alternatively, in some examples the threshold number of CBs is determined based on available resources for transmission of the HARQ ACK/NACK feedback.

In some examples of the method, apparatuses, or non-transitory computer-readable medium described above, the two or more available formats for transmitting the HARQ ACK/NACK feedback comprise a first format having a dedicated bit associated with each CB, and a second format providing an indication of a number of CBs that have NACK feedback and an index identifying a combination of CBs that have NACK feedback. Additionally or alternatively, in some examples the second format includes a plurality of bits that are less than the number of CBs.

In some examples of the method, apparatuses, or non-transitory computer-readable medium described above, the two or more available formats for transmitting the HARQ ACK/NACK feedback further comprise a third format providing a HARQ ACK/NACK feedback for one or more bundles of CBs. Additionally or alternatively, in some examples the third format provides an indication of a number of CBs in each bundle of CBs, a number of bundles of CBs in which CBs in the bundle have NACK feedback, and an index identifying a combination of bundles of CBs that have NACK feedback.

In some examples of the method, apparatuses, or non-transitory computer-readable medium described above, the two or more available formats for transmitting the HARQ ACK/NACK feedback further comprise a fourth format having a dedicated bit associated with two or more bundles of CBs. Additionally or alternatively, in some examples the format for transmitting the HARQ ACK/NACK feedback is dynamically selected based at least in part on a number of CBs having a NACK feedback.

In some examples of the method, apparatuses, or non-transitory computer-readable medium described above, the format for transmitting the HARQ ACK/NACK feedback is semi-statically selected based at least in part on channel conditions associated with the transmission of the plurality of CBs. Additionally or alternatively, in some examples the format for transmitting the HARQ ACK/NACK feedback is signaled using radio resource control (RRC) signaling. In some examples, the format for transmitting the HARQ ACK/NACK feedback is selected from a group of formats that are signaled using RRC signaling.

A method of wireless communication at a wireless device is described. The method may include receiving a plurality of code blocks (CBs) in a received transmission, determining hybrid automatic repeat request (HARQ) acknowledgment/negative acknowledgment (ACK/NACK) feedback for each CB of the plurality of CBs, and transmitting the HARQ ACK/NACK feedback using a format providing an indication of a number of CBs or bundles of CBs that have NACK feedback and an index identifying a combination of CBs or bundles of CBs that have NACK feedback.

An apparatus for wireless communication at a wireless device is described. The apparatus may include means for receiving a plurality of code blocks (CBs) in a received transmission, means for determining hybrid automatic repeat request (HARQ) acknowledgment/negative acknowledgment (ACK/NACK) feedback for each CB of the plurality of CBs, and means for transmitting the HARQ ACK/NACK feedback using a format providing an indication of a number of CBs or bundles of CBs that have NACK feedback and an index identifying a combination of CBs or bundles of CBs that have NACK feedback.

A further apparatus for wireless communication at a wireless device is described. The apparatus may include a processor, memory in electronic communication with the processor, and instructions stored in the memory, wherein the instructions are executable by the processor to receive a plurality of code blocks (CBs) in a received transmission, determine hybrid automatic repeat request (HARQ) acknowledgment/negative acknowledgment (ACK/NACK) feedback for each CB of the plurality of CBs, and transmit the HARQ ACK/NACK feedback using a format providing an indication of a number of CBs or bundles of CBs that have NACK feedback and an index identifying a combination of CBs or bundles of CBs that have NACK feedback.

A non-transitory computer-readable medium storing code for wireless communication at a wireless device is described. The code may include instructions executable to receive a plurality of code blocks (CBs) in a received transmission, determine hybrid automatic repeat request (HARQ) acknowledgment/negative acknowledgment (ACK/NACK) feedback for each CB of the plurality of CBs, and transmit the HARQ ACK/NACK feedback using a format providing an indication of a number of CBs or bundles of CBs that have NACK feedback and an index identifying a combination of CBs or bundles of CBs that have NACK feedback.

In some examples of the further method, apparatuses, or non-transitory computer-readable medium described above, the format may identify a number of CBs that have NACK feedback and an index identifying a combination of CBs that have NACK feedback. Additionally or alternatively, the format may identify a number of CBs in each bundle of CBs, a number of bundles of CBs in which CBs in the bundle have NACK feedback, and an index identifying a combination of bundles of CBs that have NACK feedback.

A method of wireless communication at a wireless device is described. The method may include transmitting a plurality of code blocks (CB) to a receiver, receiving hybrid automatic repeat request (HARQ) acknowledgment/negative acknowledgment (ACK/NACK) feedback for each CB of the plurality of CBs, identifying a format, from two or more available formats, of the HARQ ACK/NACK feedback, and determining that one or more CBs of the plurality of CBs are to be retransmitted based at least in part on the received HARQ ACK/NACK feedback.

An apparatus for wireless communication at a wireless device is described. The apparatus may include means for transmitting a plurality of code blocks (CB) to a receiver, means for receiving hybrid automatic repeat request (HARQ) acknowledgment/negative acknowledgment (ACK/NACK) feedback for each CB of the plurality of CBs, means for identifying a format, from two or more available formats, of the HARQ ACK/NACK feedback, and means for determining that one or more CBs of the plurality of CBs are to be retransmitted based at least in part on the received HARQ ACK/NACK feedback.

A further apparatus for wireless communication at a wireless device is described. The apparatus may include a processor, memory in electronic communication with the processor, and instructions stored in the memory, wherein the instructions are executable by the processor to transmit a plurality of code blocks (CB) to a receiver, receive hybrid automatic repeat request (HARQ) acknowledgment/negative acknowledgment (ACK/NACK) feedback for each CB of the plurality of CBs, identify a format, from two or more available formats, of the HARQ ACK/NACK feedback, and determine that one or more CBs of the plurality of CBs are to be retransmitted based at least in part on the received HARQ ACK/NACK feedback.

A non-transitory computer-readable medium storing code for wireless communication at a wireless device is described. The code may include instructions executable to transmit a plurality of code blocks (CB) to a receiver, receive hybrid automatic repeat request (HARQ) acknowledgment/ negative acknowledgment (ACK/NACK) feedback for each CB of the plurality of CBs, identify a format, from two or more available formats, of the HARQ ACK/NACK feedback, and determine that one or more CBs of the plurality of CBs are to be retransmitted based at least in part on the received HARQ ACK/NACK feedback.

In some examples of the method, apparatuses, or non-transitory computer-readable medium described above, the identifying the format of the HARQ ACK/NACK feedback comprises blind decoding of the HARQ ACK/NACK feedback. Additionally or alternatively, in some examples the determining that one or more CBs of the plurality of CBs are to be retransmitted comprises determining a number of NACKs indicated in the HARQ ACK/NACK feedback, determining an index identifying a combination of CBs that have NACK feedback, and determining the CBs that have NACK feedback based on the index. In some examples, the format for transmitting the HARQ ACK/NACK feedback is selected from a group of formats that are signaled using RRC signaling.

Additionally or alternatively, in some examples the determining that one or more CBs of the plurality of CBs are to be retransmitted comprises determining the CBs that have NACK feedback by performing a decompression, an unbundling, or both, on the received ACK/NACK feedback, wherein the decompression, the unbundling, or both are determined based at least in part on the identified format.

In some examples of the method, apparatuses, or non-transitory computer-readable medium described above, the determining that one or more CBs of the plurality of CBs are to be retransmitted comprises determining that CBs are bundled with multiple consecutive CBs in each bundle having a same ACK/NACK feedback, determining a number of CBs associated with each bundle, determining a number of bundles having NACK feedback, determining an index identifying a combination of bundles that have NACK feedback, and determining the bundles that have NACK feedback based on the index. Additionally or alternatively, in some examples the two or more available formats comprise an uncompressed format and one or more compressed formats, and wherein the one or more compressed formats is capable of conveying ACK/NACK information for each transmitted CB of the plurality of CBs.

In some examples of the method, apparatuses, or non-transitory computer-readable medium described above, the one or more compressed formats comprise a format providing an HARQ ACK/NACK feedback for one or more bundles of CBs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
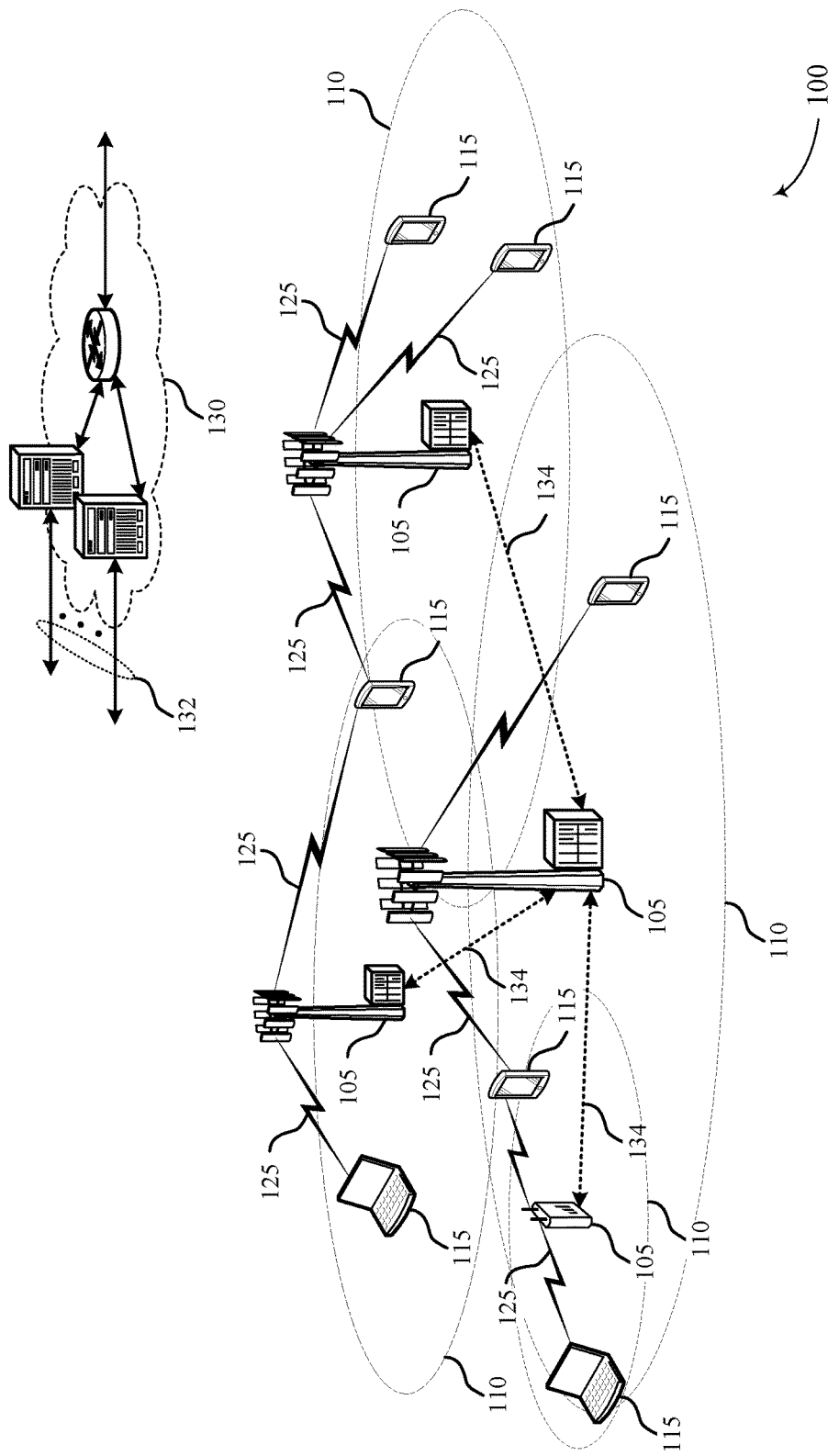
FIG. 1 illustrates an example of a wireless communications system for code block (CB) level hybrid automatic repeat request (HARQ) in accordance with various aspects of the present disclosure.

In some wireless communication systems, a transmitting device, such as a base station, may communicate control and data to a receiving device, such as a user equipment (UE), using Medium Access Control (MAC) layer units known as transport blocks. The receiving device may respond with an acknowledgment (ACK) or a negative acknowledgement (NACK) indicating whether the receiving device has successfully received and decoded each transport block. According to aspects of the present disclosure, transport blocks may be configured with subunits known as code blocks (CBs), and an ACK/NACK response may be sent for each CB. Such CB level ACK/NACK may be useful for implementations in which channel interference may occur in relatively short bursts that may last only a fraction of the length of a transport block. Retransmissions of only the affected CBs, rather than retransmission of the entire transport block, may enhance channel efficiency. Such short burst interference may be more prevalent in certain deployments, such as deployments that may use shared radio frequency spectrum or unlicensed radio frequency spectrum.

Given that each transport block may include many CBs, various aspects of the disclosure provide for efficient transmission of the additional quantity of information associated with transmitting ACK/NACK information on a CB level rather than on a transport block level. For example, sending ACKs/NACKs for CBs may increase ACK/NACK traffic on an uplink (UL) control channel, such as a physical uplink control channel (PUCCH) relative to sending ACK/NACKs for transport blocks. In certain aspects of the disclosure, a format for transmitting CB level ACK/NACK feedback may be selected from two or more available formats to efficiently use available UL resources. The two or more available formats may include compressed formats, in which the number of bits used to transmit the ACK/NACK feedback are less than the number of CBs, and an uncompressed format in which the number of bits used to transmit the ACK/NACK feedback corresponds to the number of CBs. The format for the ACK/NACK feedback may also comprise a compression scheme, a bundling scheme, or a combination thereof.

If a quantity of CBs that are transmitted is less than a threshold number of CBs, a format for ACK/NACK may be an uncompressed format, such as a bitmap, indicating which CBs are successfully received and which CBs are in error. The threshold number of CBs may be based at least in part on available uplink resources for transmitting the ACK/NACK feedback. If a quantity of CBs that are transmitted is above the threshold value, and a number of CBs in error are relatively low, a format for ACK/NACK may be a compressed format, such as a format that identifies a number of CBs that are in error and an index identifying a combination of CBs that are in error. If a quantity of CBs that are transmitted is above the threshold value, and a number of CBs in error are relatively high, a format for ACK/NACK may be a compressed format that identifies bundles of CBs that are in error, such as a format that identifies a number of CBs in each bundle, a number of bundles that are in error and an index identifying a combination of bundles that are in error.

The UL control channel may, in certain examples thus be configured support a larger payload of ACK/NACKs. Additionally, the DL control channel may benefit from efficient signaling of redundancy versions for each code block in the transport block. For instance, systems that implement CB level ACK/NACKs may enjoy just-in-time ACK/NACKs—e.g., when a base station schedules a UE in a DL burst—and the ACK/NACKs for the data which was scheduled in previous bursts may be available at the base station.

A base station that receives CB level ACK/NACK feedback for each CB of the plurality of CBs, in some instances, may not have prior knowledge of a format that is used for transmission of the ACK/NACK feedback. In such instances, the base station may perform blind decoding of the ACK/NACK feedback to identify the format that is used for the ACK/NACK feedback and then determine whether one or more CBs are to be retransmitted. In certain aspects of the disclosure, a base station may semi-statically configure the format for ACK/NACK feedback, such as through RRC signaling. The format for ACK/NACK feedback may be semi-statically configured, for example, based on channel conditions between the base station and a UE. In some examples, the format for transmitting the HARQ ACK/NACK feedback is selected from a group of formats that are signaled using RRC signaling.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 for CB level hybrid automatic repeat request (HARQ) in accordance with various aspects of the present disclosure. The wireless communications system 100 includes base stations 105, at user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on internet protocol (IP). A radio link control (RLC) layer may perform packet segmentation and reassembly to communicate over logical channels. A medium access control (MAC) layer may perform priority handling and multiplexing of logical channels into transport channels. The transport channels may be in transport blocks at the bottom of the MAC. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels. For example, a MAC layer transport block may be mapped to a subframe at the PHY layer. The transport block may include a CRC field for error detection at the receiver. Thus, HARQ may be implemented on a transport block-level basis. However, HARQ may also be implemented according to a finer resolution. For example, in various aspects of the disclosure a transport block may be divided into CBs, each of which may have a CRC that a UE 115 may use for HARQ. The CBs, in some examples, may be bundled into multiple bundles having a certain number of CBs, the corruption of which may be monitored using HARQ. The size of a CB, or bundle of CBs may be predefined, and in some cases may be limited to a minimum or maximum number of bits.

The number of bits transferred in a transport block may be based on the modulation and coding scheme (MCS), as well as the number of resource blocks assigned to the UE for which the transport block is intended. The MAC of a base station 105 may identify or determine a modulation scheme which can be handled by a UE 115 and check the physical resources for availability of resource blocks. Using this information, the MAC of the base station 105 may identify or determine an MCS and the number of resource blocks that can be allocated to the UE 115. In some instances, the MCS and resource allocation may be used to reference a table which gives the transport block size for the subframe. If the transport block size is greater than a maximum code block size, the transport block may be segmented into CBs. If the transport block is smaller than a minimum code block size, the transport block may be represented by one CB, which may be appended with filler bits to match the minimum code block size.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, or the like. The terms "carrier," "component carrier," and "cell" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced CCs (eCC). An enhanced component carrier (eCC) may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 μs). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 μs). A TTI in eCC may consist of one or multiple symbols. In some cases, the TTI duration (that is, the number of symbols in a TTI) may be variable.

Wireless system 100 may implement error detection codes for transmissions to detect accidental changes to raw data. For example, a CRC may be used to detect errors during the decoding of received data. Before transmission, the CRC may be derived from the data according to a predetermined calculation. The CRC may then be appended to the data, which is subsequently transmitted. The receiving entity may perform the same calculation and check the result against the CRC bits. If the CRC bits do not match the calculated value, the CRC may be deemed to have failed, and the receiving entity may determine that the data has been corrupted.

HARQ may be a method of ensuring that data is received correctly over a wireless communication link 125. The MAC layer may be responsible for managing the HARQ function, which may be a transport block level automatic retry or a CB level automatic retry. HARQ may include a combination of error detection (e.g., using a CRC), FEC, and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data.

For example, a UE 115 may buffer a number of failed CBs to reconstruct a signal. The UE 115 may store the unsuccessfully decoded CBs in buffers to use in conjunction with retransmitted CBs in the reconstruction of the data. HARQ may be done in combination between the MAC and the PHY; the PHY may handle retention and re-combination and the MAC may perform management and signaling. For example, when there is a CB CRC failure, the PHY may indicate the failure to the MAC. Accordingly, the MAC may indicate a NACK, which may prompt a retransmission from the transmitting entity which originally sent the CB.

A base station 105 may schedule DL resources using a PDCCH. PDCCH may carry downlink control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

According to the present disclosure, wireless devices such as a base station 105 and a UE 115 may exchange data using transport blocks that include multiple CBs. For example, a UE 115 may attempt to decode a transport block and send ACK/NACK information to a base station 105 based on whether each CB was successfully decoded. In certain aspects of the disclosure, a format for transmitting CB level ACK/NACK feedback may be selected from two or more available formats to efficiently use available UL resources. The two or more available formats may include compressed formats, in which the number of bits used to transmit the ACK/NACK feedback are less than the number of CBs, and an uncompressed format in which the number of bits used to transmit the ACK/NACK feedback corresponds to the number of CBs. The format for the ACK/NACK feedback may also comprise a compression scheme, a bundling scheme, or a combination thereof. The base station 105 may receive the CB level ACK/NACK feedback, determine CBs that are indicated as being in error, and retransmit CBs that are indicated as being in error.

A UE 115 may apply compression, bundling, or a combination thereof, on ACK/NACKs for feedback transmission. This may apply for both UL and DL transmissions. The UE 115 may select a compression scheme to use for CB compression and/or bundling.

For example, a UE 115 may first attempt a smallest CB bundling size (e.g. no bundling) according to a compression scheme that UE 115 selected from a group of compression schemes. The UE 115 may then compress the CBs. If, after compression, the number of bits is within a feedback channel capacity, then the UE 115 may transmit the ACK/NACK feedback. If the number of bits is not within the feedback channel capacity, then the UE 115 may select another compression scheme (e.g. bundling and compression), and the UE 115 may bundle the bits in the next smallest bundle size and subsequently compress the bits. This process may continue until the number of bits is within the feedback channel capacity.

As an additional and more specific example, a UE 115 may receive 200 CBs. 200 ACK/NACK bits may be generated from a decoder. A feedback channel capacity may be determined to be 40 bits. Since 200 bits exceed the 40 bit feedback channel capacity, the UE 115 may compress and/or bundle the bits. The UE 115 may attempt a compression scheme with no bundling, where the compression scheme may be chosen by a receiver algorithm. This compression may result in 90 bits, which exceeds the 40 bit feedback channel capacity. The UE 115 may subsequently attempt a compression scheme with bundling of size 2 and no compression which may result in 100 bits. The 100 bits exceeds the 40 bit feedback channel capacity, so the UE 115 may then attempt a compression scheme with a bundling size of 2 and compression, which results in 50 bits. Since 50 bits exceed the 40 bit threshold, the UE 115 may then attempt a compression scheme with a bundling of size 4 and no compression. This may result in 50 bits, which still exceeds the 40 bit threshold. The UE 115 may then attempt a compression scheme with bundling of size 4 and compression, resulting in 35 bits. Since 35 bits is below the feedback channel capacity, the UE 115 may then transmit the produced 35 bit ACK/NACK. The specific numbers and results of this example are merely exemplary and are not meant to be limiting.

Figure 2:
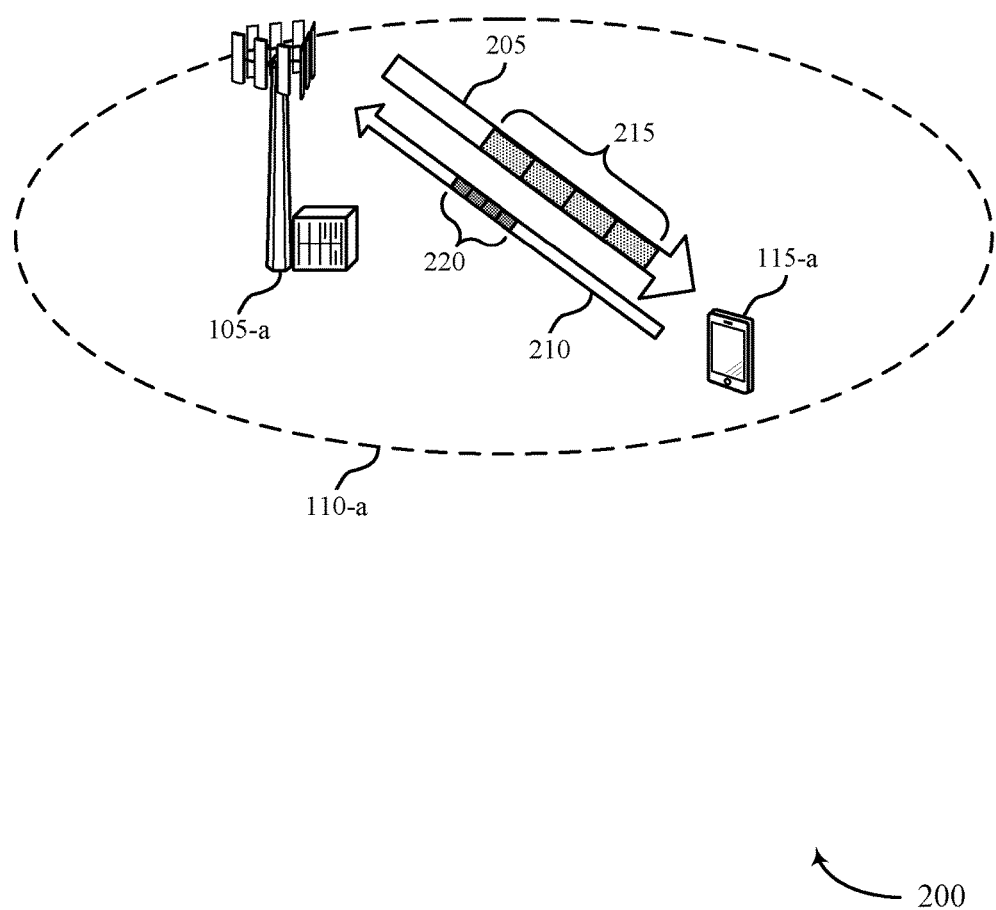
FIG. 2 illustrates an example of a wireless communications system for CB level HARQ in accordance with various aspects of the present disclosure.

FIG. 2 illustrates an example of a wireless communications system 200 for CB level HARQ in accordance with various aspects of the present disclosure. Wireless communications system 200 may include UE 115-*a*, which may be an example of a UE 115 described with reference to FIG. 1. Wireless communications system 200 may also include a base station 105-*a*, which may be an example of a base station 105 described with reference to FIG. 1. Base station 105-*a* may transmit control and data to any UE 115 within its coverage area 110-*a* via downlink (e.g., downlink 205). For instance, base station 105-*a* may transmit data to UE 115-*a* in a transport block 215, which may be part of downlink 205. UE 115-*a* may communicate with base station 105-*a* via uplink (e.g., uplink 210). For example, UE 115-*a* may indicate the status for portions of transport block 215 via acknowledgments (ACKs) and negative acknowledgments (NACKs) (e.g., ACK/NACKs 220).

In some cases, transport block 215 may include multiple CBs, for example there may be four CBs, as illustrated in wireless communications system 200. Of course, it will be readily understood by one of skill in the art that these illustrations are for purposes of description and discussion, and that numerous other configurations and numbers of CBs in a transport block may be implemented. Different transport blocks may have the same or different number of CBs. CRC parity bits may be included with each CB, and, in some cases, for a bundle of CBs or for the transport block 215 as a whole. The UE 115-*a* may use CRCs to detect errors during the decoding process and transmit ACK/NACKs 220 accordingly. For example, UE 115-*a* may send CB level ACK/NACKs 220, and base station 105-*a* may retransmit one or more of the CBs based on the ACK/NACKs 220.

In other words, the CBs may be the minimum unit of PDSCH that is ACK/NACKed. For example, UE 115-*a* may transmit a NACK for a CB if a CRC fails for the CB. The NACK may serve as an indication to base station 105-*a* to resend the CB. In certain aspects of the disclosure, as will be discussed in more detail below, a format for transmitting CB level ACK/NACKs 220 may be selected from two or more available formats, and may allow for relatively efficient use available UL resources. The two or more available formats may include compressed formats, in which the number of bits used to transmit the ACK/NACKs 220 are less than the number of CBs in the transport block 215, and an uncompressed format in which the number of bits used to transmit the ACK/NACKs 220 corresponds to the number of CBs in the transport block 215.

The base station 105-*a* may receive the CB level ACK/NACKs 220, and determine CBs that are indicated as being in error, and retransmit CBs that are indicated as being in error. In some aspects of the disclosure, the UE 115-*a* may dynamically determine whether the ACK/NACKs 220 are to be transmitted in a compressed or uncompressed format. Furthermore, multiple different compressed formats may be available, and the UE 115-*a* may also dynamically select the compressed format for use in transmission of the ACK/NACKs 220. The ACK/NACK formats and selection of particular formats will be described in more detail below.

In some examples, the format for transmitting the HARQ ACK/NACK feedback is selected from a group of formats that are signaled using RRC signaling. In such case, At the base station 105-*a*, the format used to transmit the ACK/NACKs 220 may not be known prior to receiving the ACK/NACKs 220. In such instances, the base station 105-*a* may perform blind decoding of the ACK/NACKs 220 to identify the format that is used for the ACK/NACKs 220 and then determine whether one or more CBs are to be retransmitted. Alternatively, the ACK/NACK may be transmitted along with an indication of the format used, in which case the base station determines the format based on the indication. In other examples, base station 105-*a* may indicate a single format to use for the ACK/NACKs 220 in downlink transmission 205. For example, the base station 105-*a* may semi-statically configure the format for ACK/NACKs 220 through RRC signaling transmitted in downlink transmission 205. The format may be semi-statically configured, for example, based on channel conditions between the base station 105-*a* and UE 115-*a*.

Figure 3:
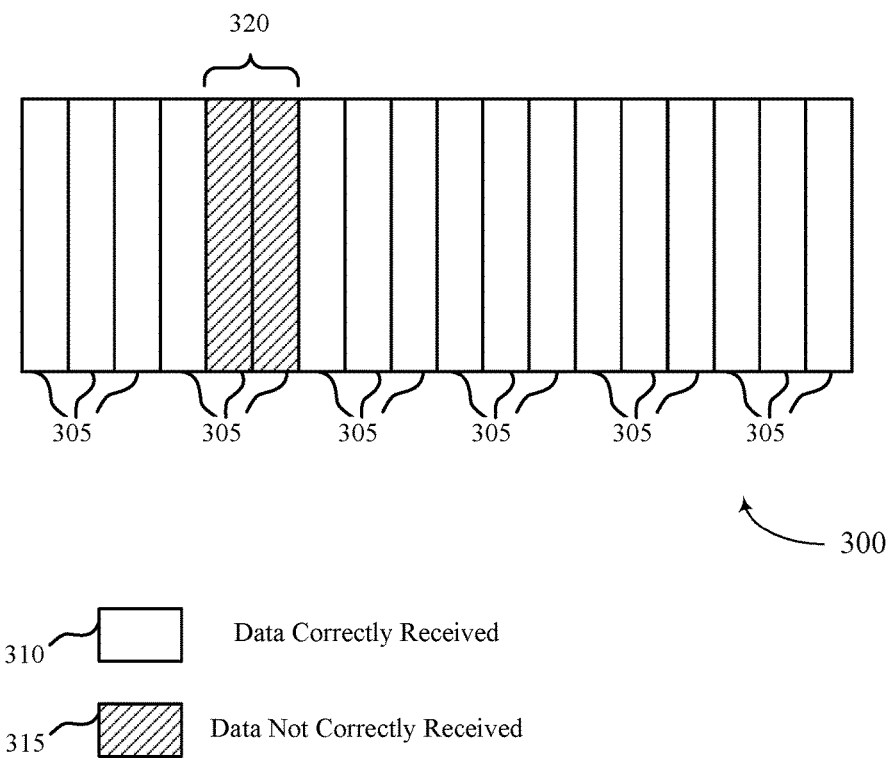
FIG. 3 illustrates an example of a transport block and associated code blocks for CB level HARQ in accordance with various aspects of the present disclosure.

Next, FIG. 3 illustrates an example of a transport block 300 for CB level HARQ in accordance with various aspects of the present disclosure. Transport block 300 may be an example of a transport block sent from a base station 105 to a UE 115, as described with reference to FIG. 2. Transport block 300 may include a number of code blocks 305, that may be evaluated for successful reception by a receiver, such as a UE 115. In this example, a number of CBs 305 include correctly received data 310, as well as two CBs 305 that include incorrectly received data 315 (e.g., the data of the CB failed CRC).

As indicated above, the ACK/NACKs associated with CBs 305 may be transmitted according to either a compressed format or an uncompressed format. In certain scenarios, compressed transmission of ACK/NACK information may provide enhanced spectral efficiency, particularly when transmitting CB level ACK/NACK feedback, which will generate additional data relative to ACK/NACK feedback performed at a transport block level. Furthermore, compressed formats for ACK/NACK feedback may be used without a loss of information regarding the particular CBs 305 that are received in error. In certain scenarios, each bit reserved for ACK/NACK may not actually carry one bit of information. For example, if the probability of an ACK (P(ACK)) is 0.99 (i.e., a 1% error rate) the Entropy(ACK/NACK) is actually 0.0808 bits. Similarly, for P(ACK) of 0.9 (i.e., a 10% error rate), Entropy(ACK/NACK) is 0.4690 bits. Only at a 50% error rate would a dedicated bit for each CB (or transport block if providing a dedicated ACK/NACK bit for each transport block) carry one bit of information. Furthermore, for a given MCS, the block error rate (BLER) for a transport block is higher than the BLER for a CB. For example, if 10 CBs 305 are included in a transport block 300, a 10% transport block BLER would equate to approximately a 1% CB BLER. Thus, fewer information bits are needed to convey CB level ACK/NACK than would be required to convey transport block level ACK/NACK for a given BLER. In some examples, source coding compression may be used for compression or ACK/NACK feedback.

In various aspects of the disclosure, the CB level ACK/NACK may indicate only the CBs 305 that have incorrectly received data 315, and not one dedicated bit for each CB 305. In such a manner, data may be efficiently conveyed for a relatively large number of CBs 305. According to some examples, as will be discussed in more detail with respect to FIG. 4, compressed ACK/NACK formats may include one or more dedicated bits that may indicate a number of CBs that are in error, and one or more dedicated bits that may indicate a combination of CBs that are in error. In other examples, CBs 305 may be bundled with two or more consecutive CBs 305 included in a bundle 320 of CBs. A compressed ACK/NACK format may then include one or more dedicated bits that indicate a number of CBs 305 in each bundle 320 of CBs, a number of bundles 320 in error, and one or more dedicated bits that may indicate a combination of bundles that are in error. Bundling of CBs 305 may be beneficial if received interference has a relatively long duration that results in an error in the reception of multiple consecutive CBs.

Figure 4A:
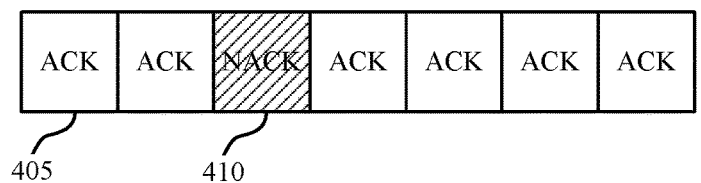
FIG. 4A illustrates an example of a format for transmitting HARQ feedback in accordance with various aspects of the present disclosure.

Next, FIG. 4A illustrates an example of an ACK/NACK format 400 for CB level HARQ in accordance with various aspects of the present disclosure. ACK/NACK format 400 may be an example of a format for transmitting ACK/NACKs from a UE 115 to a base station 105, as described with reference to FIG. 2. ACK/NACK format 400 may include a number of ACK bits 405 and NACK bits 410, the total number of which correspond to a number of CBs. Thus, ACK/NACK format 400 provide a bitmap indicating which CBs are received properly or improperly. A transmitter receiving the ACK/NACK format 400 may recognize this bitmap and may determine particular CBs that are to be retransmitted. Such a format 400 may be useful in scenarios where there are relatively few CBs, and sufficient uplink resources are available to transmit the information. A determination to use ACK/NACK format 400 may be dynamically performed by a UE based on the number of CBs and available uplink resources, or may be signaled by a base station (e.g., through RRC signaling). In some examples, ACK/NACK format 400 may be used to transmit information on bundles of CBs, in which case each ACK bit 405 or NACK bit 410 may provide ACK/NACK for two or more consecutive CBs.

Figure 4B:
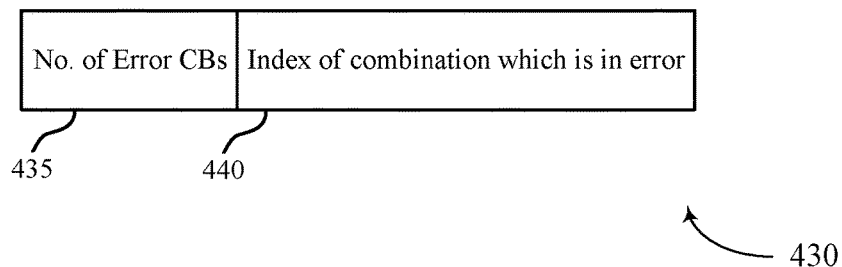
FIG. 4B illustrates another example of a format for transmitting HARQ feedback in accordance with various aspects of the present disclosure.

Next, FIG. 4B illustrates an example of an ACK/NACK format 430 for CB level HARQ in accordance with various aspects of the present disclosure. ACK/NACK format 430 may be an example of a compressed format for transmitting ACK/NACKs from a UE 115 to a base station 105, as described with reference to FIG. 2. ACK/NACK format 430 may include one or more dedicated bits 435 that indicate a number of CBs that are in error, and a set of bits 440 that provide an index identifying a combination of CBs that are in error, and thus have NACK feedback. The index may be, for example, an index into a lookup table that provides a bitmap of ACK/NACKs for the number of CBs indicated in the set of bits. In certain examples, one or more fixed output length compression codes may be used for ACK/NACK format 430, which may provide for relatively efficient system design and assist in blind decoding of formats by a transmitter.

In some examples, ACK/NACK format 430 may be identified for transmitting ACK/NACK feedback based on the number of transmitted CBs (referred to as 'N'), a number of errors (referred to as k') in the transmitted CBs, and a predefined threshold of errors (referred to as K*'). The predefined threshold of errors K* may be based on, for example, the number of CBs, and available UL resources for transmitting ACK/NACK feedback. In some examples, a receiver may identify ACK/NACK format 430 when k<K*, and the number of bits used to convey the ACK/NACK feedback would be $\log_2$ (K*) bits to indicate the number of errors, and $\log_2$ $$\binom{N}{k}$$

bits to indicate which combination of CBs is in error. ACK/NACK format 430 may be used, for example, in scenarios where the BLER is relatively low.

Figure 4C:
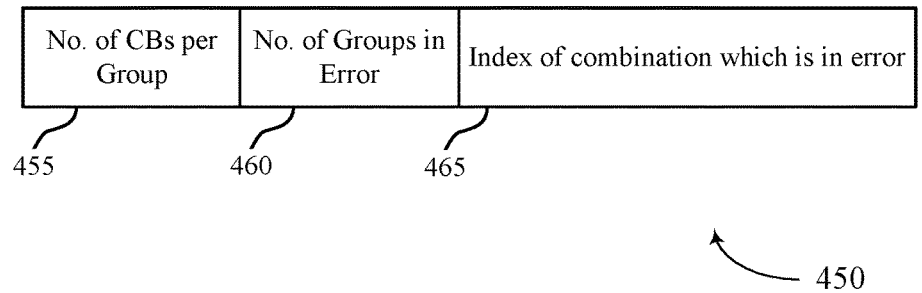
FIG. 4C illustrates another example of a format for transmitting HARQ feedback in accordance with various aspects of the present disclosure.

Next, FIG. 4C illustrates an example of an ACK/NACK format 450 for CB level HARQ in accordance with various aspects of the present disclosure. ACK/NACK format 450 may be an example of a format for transmitting ACK/NACKs from a UE 115 to a base station 105, as described with reference to FIG. 2. ACK/NACK format 450 may be used to indicate bundles of CBs that are in error, and may include one or more dedicated bits 455 that indicate a number of CBs per bundle of CBs, a set of bits that indicate the number of bundles in error 460, and an index 465 indicating a combination of bundles of CBs that are in error (and thus have NACK feedback). The index may be, for example, an index into a lookup table that provides a bitmap of ACK/NACK bundles for the number of bundles indicated in the set of bits. In certain examples, one or more fixed output length compression codes may be used for ACK/NACK format 450, which may provide for relatively efficient system design and assist in blind decoding of formats by a transmitter.

In some examples, ACK/NACK format 450 may be identified for transmitting ACK/NACK feedback when the number of CBs in error exceed a threshold, or if a relatively large number of consecutive CBs are in error. In some examples, the number of codewords (C) may be bundled to indicate CB bundles in error. A predefined threshold of CB bundles in error (K*) may be identified, as well as a number of CB bundles in error (referred to as 'k'). The predefined threshold of CB bundles in error K* may be based on, for example, the number of CBs, and available UL resources for transmitting ACK/NACK feedback. In some examples, the number of bits used to convey the ACK/NACK feedback in format 450 would be $\log_2$ (C) bits to indicate the number of CBs per bundle of CBs, $\log_2$ (K*) bits to indicate the number of CB bundles in error, and $\log_2$ $$\binom{N/C}{k}$$

bits to indicate which combination of bundles of CBs is in error.

Other examples of compression format schemes may include the use of a Golomb code for sending continuous ACKs with a fewer number of bits. A table may be used to map input strings to output strings, and the UE may encode ACK/NACKs for multiple CBs according to a selected table.

An additional example of a compression format scheme may include the use of run-length encoding (RLE), where continuous strings of 0's may be encoded using k bits. On the other hand, 1's may not be encoded, and two consecutive 1's may be separated by k bit 0s. Thus, in an example where k is 4, two consecutive 1's may be separated by 4 bits of 0's. As a further example where k is 4, a 19 bit input of 0010001100000000000 may have a corresponding 16 bit output of 0010 0011 0000 1011. RLE is especially effective when the input includes many strings of consecutive 0's.

Figure 5:
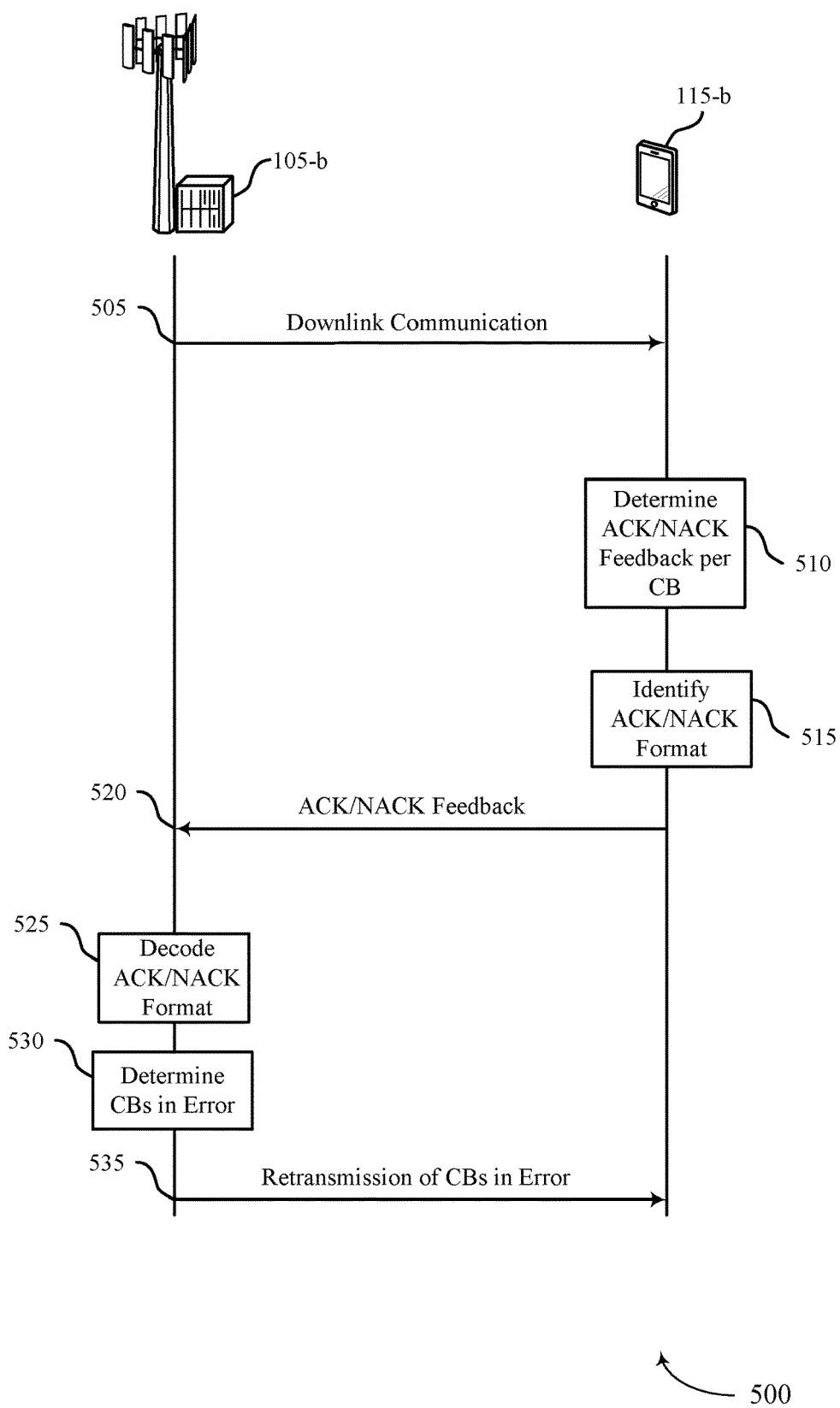
FIG. 5 illustrates an example of a process flow for CB level HARQ in accordance with various aspects of the present disclosure.

FIG. 5 illustrates an example of a process flow 500 for CB level HARQ in accordance with various aspects of the present disclosure. Process flow 500 may include a UE 115-b, which may be an example of a UE 115 described above with reference to FIGS. 1-4. Process flow 500 may also include a base station 105-b, which may be an example of a base station 105 described above with reference to FIGS. 1-4. Although described in reference to a base station 105 and UE 115, the steps of process flow 500 may be performed by any set of wireless devices communicating with CB level HARQ.

At step 505, base station 105-b may transmit downlink communications to UE 115. The downlink communications may include one or more transport blocks of data, each of which may include multiple CBs, in a manner similarly as discussed above.

At step 510, the UE 115-b may determine ACK/NACK feedback per CB. ACK/NACK feedback may be performed according to established HARQ routines, for example.

At step 515, the UE 115-b identify an ACK/NACK format to use for transmission of ACK/NACK feedback to the base station 105-b. The identification of the ACK/NACK format may be performed in a manner similarly as discussed above. In some examples, if a quantity of CBs that are transmitted is less than a threshold number of CBs, a format for ACK/NACK may be an uncompressed format (e.g., ACK/NACK format 400 of FIG. 4A), such as a bitmap, indicating which CBs are successfully received and which CBs are in error. The threshold number of CBs may be based at least in part on available uplink resources for transmitting the ACK/NACK feedback. If a quantity of CBs that are transmitted is above the threshold value, and a number of CBs in error are relatively low, a format for ACK/NACK may be a compressed format (e.g., ACK/NACK format 430 of FIG. 4B), such as a format that identifies a number of CBs that are in error and an index identifying a combination of CBs that are in error. If a quantity of CBs that are transmitted is above the threshold value, and/or a number of CBs in error are relatively high, a format for ACK/NACK may be a compressed format that identifies bundles of CBs that are in error (e.g., ACK/NACK format 450 of FIG. 4C), such as a format that identifies a number of CBs in each bundle, a number of bundles that are in error and an index identifying a combination of bundles that are in error. The identification of the ACK/NACK format may be performed dynamically by the UE 115-b, or may be configured by the base station 105-b.

At step 520, the UE 115-b may transmit (and base station UE 105-b may receive) ACK/NACK feedback including ACK/NACK information in a format identified by the UE 115-b.

At step 525, the base station 105-b may decode the ACK/NACK feedback format. The base station 105-b may do a blind decode of the ACK/NACK feedback and identify fields of information (e.g., dedicated bits indicating a number of CBs in error, or indicating a number of CBs included in bundles of CBs) detected in the ACK/NACK feedback. In some examples, the base station 105-b may signal an ACK/NACK format to the UE 115-b, in which case the base station 105-b decodes the ACK/NACK feedback according to the signaled format.

At step 530, base station UE 105-b may determine the CBs in error. Such a determination may be based on the format of the ACK/NACK feedback and a decompression associated with the particular format, for example. If it is determined that the ACK/NACK feedback is uncompressed, the CBs in error may simply be determined based on a bitmap associated with the transmitted CBs.

At step 535, the base station 105-b may retransmit (and UE 115-b may receive) CBs that were in error. Such a process may then repeat, as will be readily understood by one of skill in the art.

Figure 6:
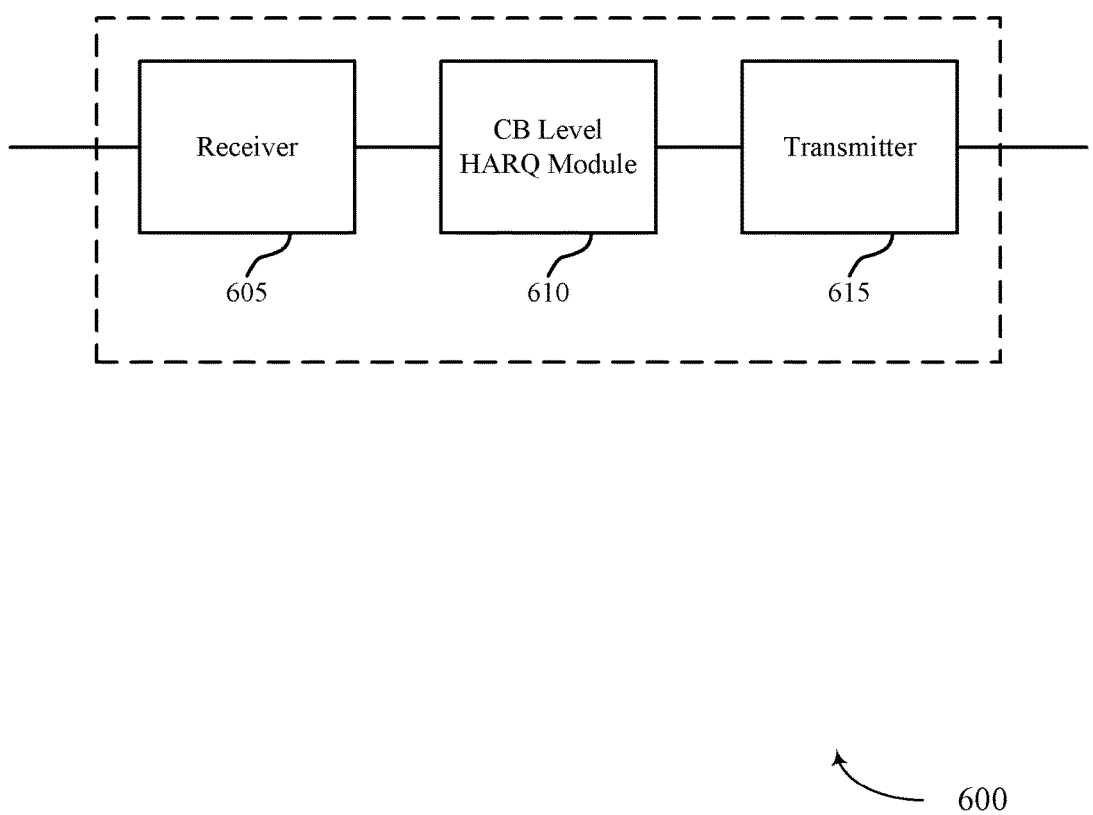
FIG. 6 shows a block diagram of a device configured for CB level HARQ in accordance with various aspects of the present disclosure.

FIG. 6 shows a block diagram of a wireless device 600 configured for CB level HARQ in accordance with various aspects of the present disclosure. Wireless device 600 may be an example of aspects of a UE 115 or a base station 105 described with reference to FIGS. 1-5. Wireless device 600 may include a receiver 605, a CB level HARQ module 610, or a transmitter 615. Wireless device 600 may also include a processor. Each of these components may be in communication with one another.

The receiver 605 may receive information such as packets, user data, or control information associated with various information channels (e.g., control channels, data channels, and information related to CB level HARQ, etc.). Information may be passed on to the CB level HARQ module 610, and to other components of wireless device 600. In some examples, the receiver 605 may receive a number of CBs transmitted by a transmitter. In some examples, the receiver may receive ACK/NACK feedback from a receiver of a data transmission.

The CB level HARQ module 610 may identify a format for ACK/NACK transmissions, such as discussed above with respect to FIGS. 1-5. In some examples, the CB level HARQ module 610, in combination with, e.g., the transmitter 615, may transmit a number of CBs during a TTI, and in combination with, e.g., the receiver 605, may receive ACK/NACK feedback for the transmitted CBs. In other examples, the CB level HARQ module 610, in combination with, e.g., the receiver 605, may receive a number of CBs during a TTI, and in combination with, e.g., the transmitter 615, may transmit ACK/NACK feedback for the received CBs according to the identified format.

The transmitter 615 may transmit signals received from other components of wireless device 600. In some examples, the transmitter 615 may be collocated with the receiver 605 in a transceiver module. The transmitter 615 may include a single antenna, or it may include a several antennas.

Figure 7:
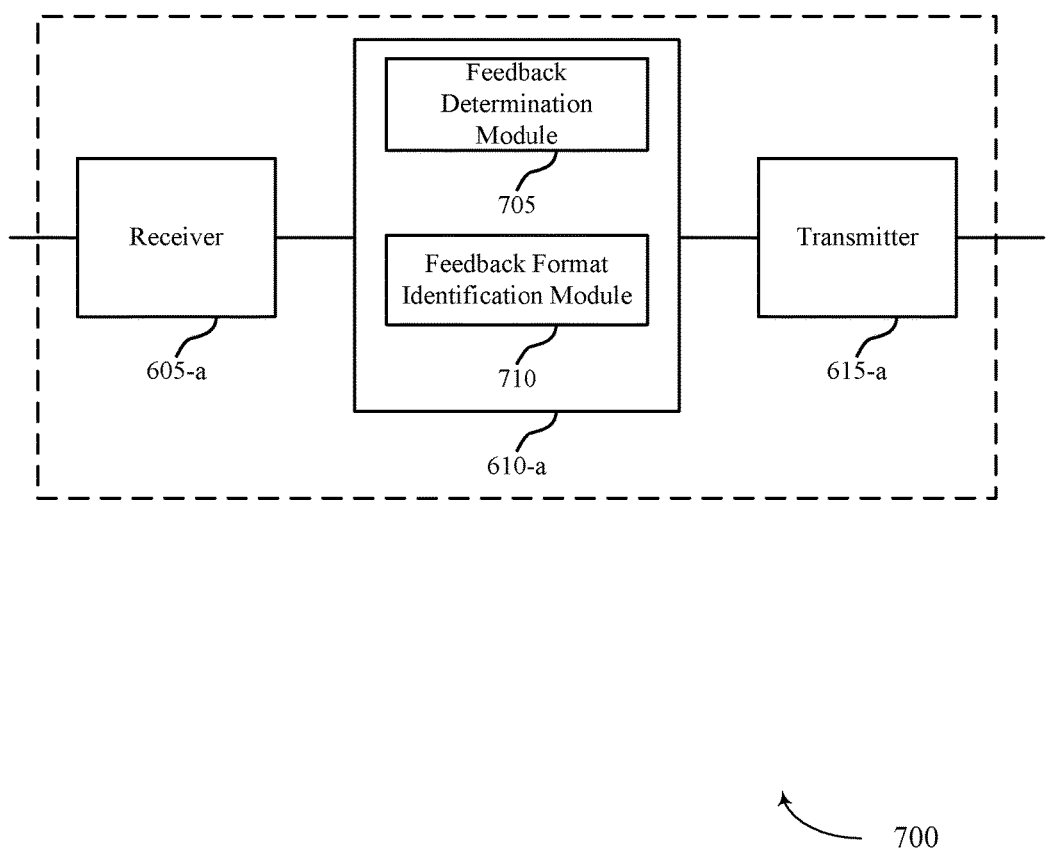
FIG. 7 shows a block diagram of a device configured for CB level HARQ in accordance with various aspects of the present disclosure.

FIG. 7 shows a block diagram of a wireless device 700 for CB level HARQ in accordance with various aspects of the present disclosure. Wireless device 700 may be an example of aspects of a wireless device 600 or a UE 115 or a base station 105 described with reference to FIGS. 1-6. Wireless device 700 may include a receiver 605-a, a CB level HARQ module 610-a, or a transmitter 615-a. Wireless device 700 may also include a processor. Each of these components may be in communication with one another. The CB level HARQ module 610-a may also include a feedback determination module 705, and a feedback format identification module 710.

The receiver 605-a may receive information which may be passed on to CB level HARQ module 610-a, and to other components of wireless device 700. The CB level HARQ module 610-a may perform the operations described above with reference to FIG. 6. The transmitter 615-a may transmit signals received from other components of wireless device 700.

The feedback determination module 705 may identify ACK/NACK feedback associated with one or more CBs transmitted during a TTI, as described above with reference to FIGS. 2-5. The feedback determination module 705 may, for example, determine that one or more CBs received at receiver 605-a were received in error. In other examples, feedback determination module 705 may receive ACK/NACK information from receiver and determine that one or more previously transmitted CBs were not properly received. The feedback format identification module 710 may determine a format for ACK/NACK feedback, in a manner similar as discussed above with respect to FIGS. 1-6.

Figure 8:
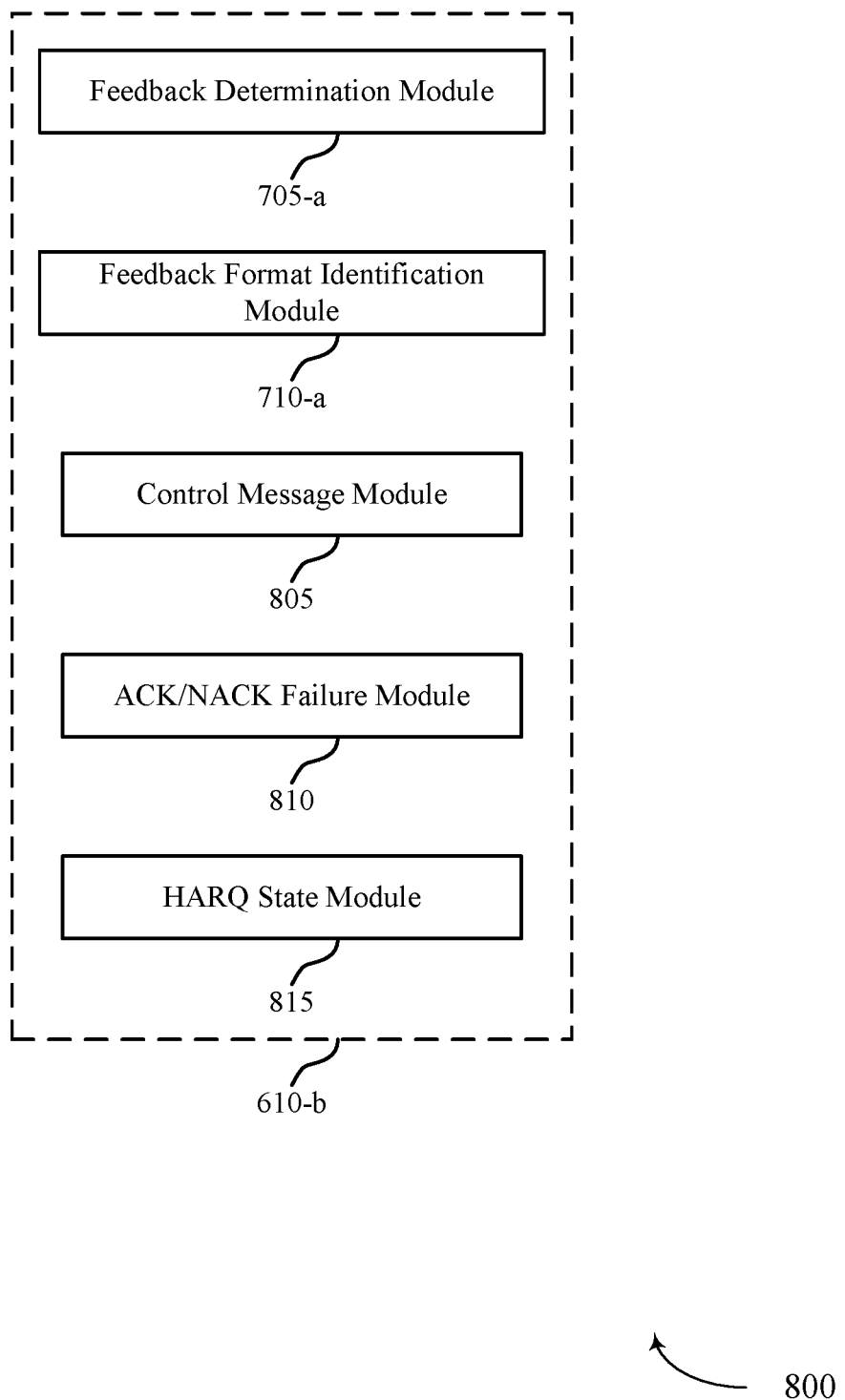
FIG. 8 shows a block diagram of a CB level HARQ module configured for CB level HARQ in accordance with various aspects of the present disclosure.

FIG. 8 shows a block diagram 800 of a CB level HARQ module 610-b which may be a component of a wireless device 600 or a wireless device 700 for CB level HARQ in accordance with various aspects of the present disclosure. The CB level HARQ module 610-b may be an example of aspects of a CB level HARQ module 610 described with reference to FIGS. 6-7. The CB level HARQ module 610-b may include a feedback determination module 705-a, and a feedback format identification module 710-a. Each of these modules may perform the functions described above with reference to FIG. 7. The CB level HARQ module 610-b may also include a control message module 805, an ACK/NACK failure module 810, and a HARQ state module 815. The various modules of CB level HARQ module 610-b may be in communication with one another.

The control message module 805 may transmit a control message for the TTI that includes, in some examples, an indication of which ACK/NACK format to be used for ACK/NACK feedback, as described above with reference to FIGS. 1-5. The ACK/NACK failure module 810 may configure an ACK/NACK feedback message to include an ACK/NACK failure indicator, as described above with reference to FIGS. 2-5. In some examples, the ACK/NACK failure module 810 may also determine whether an ACK or a NACK was received for a transmitted CB.

The HARQ state module 815 may store a HARQ state corresponding to several transmitted CBs, as described above with reference to FIGS. 2-5. The HARQ state module 815 may also update the HARQ state based on the ACK/NACK response. The HARQ state module 815 may, for instance, determine that an ACK/NACK response has not been received for one or more transmitted CBs.

The components of wireless device 600, wireless device 700, or CB level HARQ module 610-b may each, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
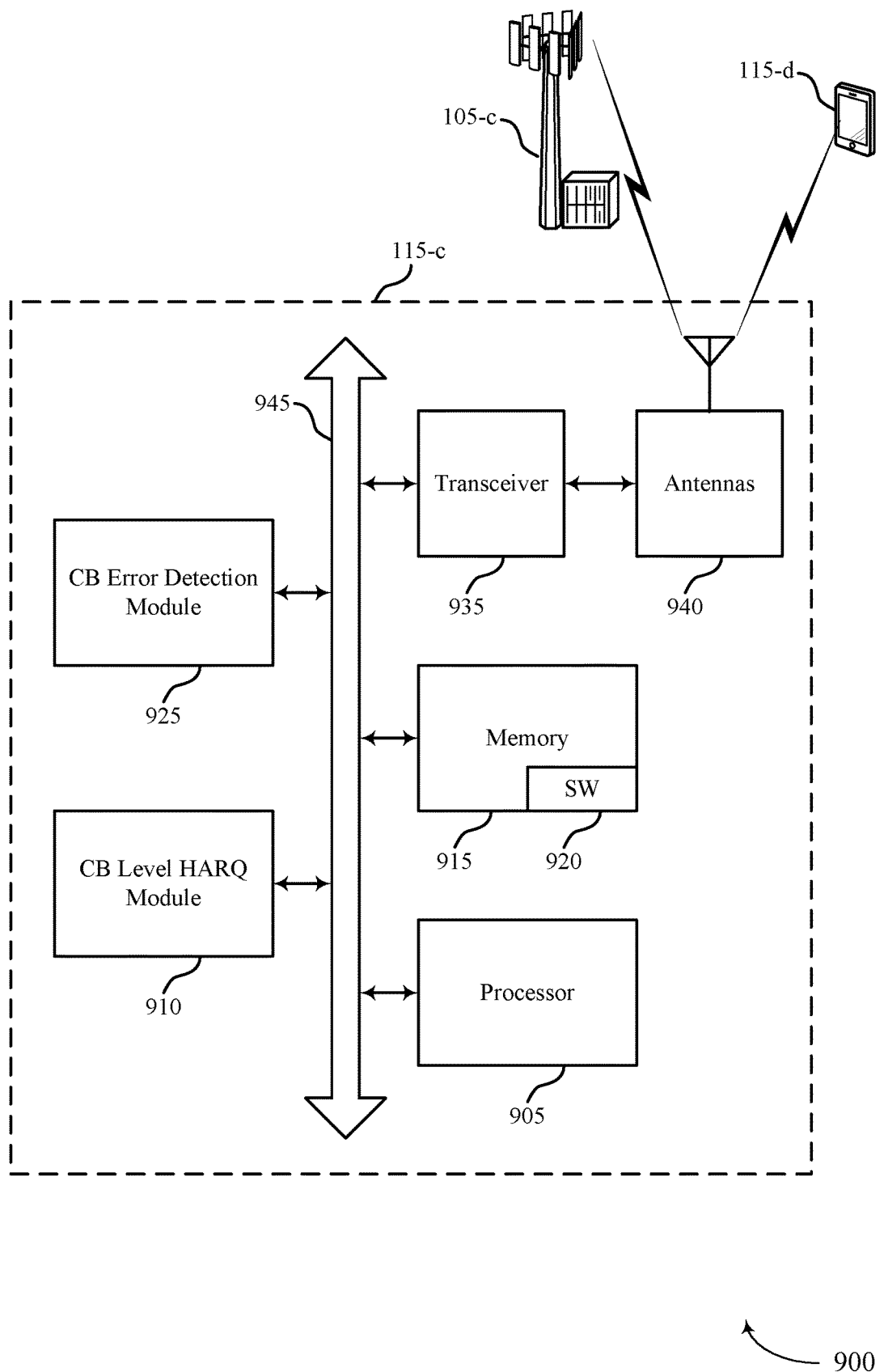
FIG. 9 illustrates a block diagram of a system including a UE configured for CB level HARQ in accordance with various aspects of the present disclosure.

FIG. 9 shows a diagram of a system 900 including a UE configured for CB level HARQ in accordance with various aspects of the present disclosure. System 900 may include UE 115-c, which may be an example of a wireless device 600, or a wireless device 700 described above with reference to FIGS. 1-7. UE 115-c may include a CB level HARQ module 910, which may be an example of a CB level HARQ module 610 described with reference to FIGS. 6-7. In some examples, UE 115-c may include a CB error detection module 925. UE 115-c may also include components for bi-directional voice and data communications including components for transmitting communications and components for receiving communications. For example, UE 115-c may communicate bi-directionally with base station 105-c or UE 115-d.

The CB error detection module 925 may perform a CRC on received code blocks to determine whether each code block has been correctly received. In some cases, a transmitted or received transport block may include at least one CRC field—e.g., associated with code blocks, CBs, or transport blocks—as described above with reference to FIGS. 2-5.

UE 115-c may also include a processor 905, and memory 915 (including software (SW) 920), a transceiver module 935, and one or more antenna(s) 940, each of which may communicate, directly or indirectly, with one another (e.g., via buses 945). The transceiver module 935 may communicate bi-directionally, via the antenna(s) 940 or wired or wireless links, with one or more networks, as described above. For example, the transceiver module 935 may communicate bi-directionally with a base station 105 or another UE 115. The transceiver module 935 may include a modem to modulate the packets and provide the modulated packets to the antenna(s) 940 for transmission, and to demodulate packets received from the antenna(s) 940. While UE 115-e may include a single antenna 940, UE 115-c may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., CB level HARQ, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an ASIC, etc.)

Figure 10:
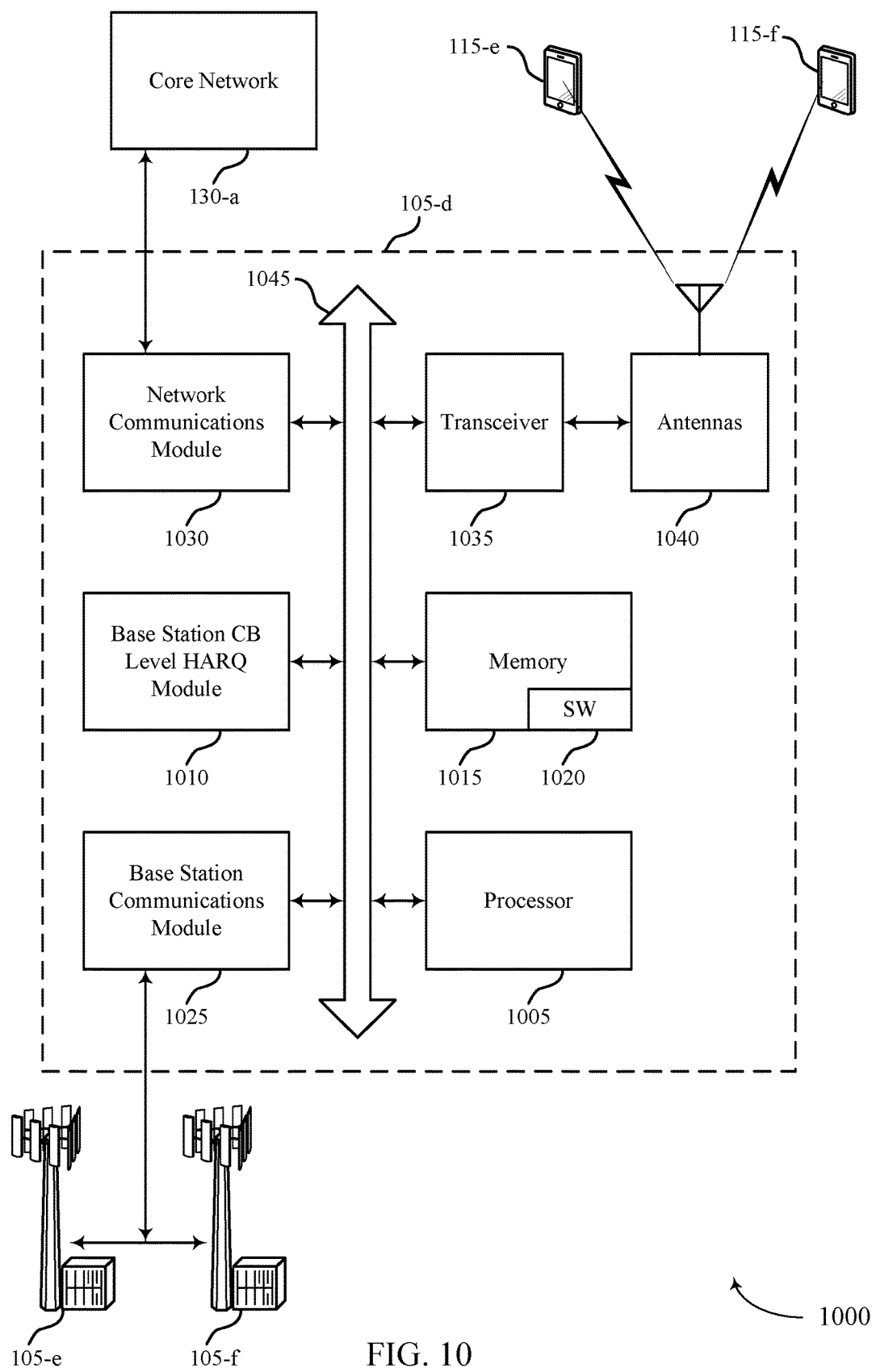
FIG. 10 illustrates a block diagram of a system including a base station configured for CB level HARQ in accordance with various aspects of the present disclosure.

FIG. 10 shows a diagram of a system 1000 including a base station 105 configured for CB level HARQ in accordance with various aspects of the present disclosure. System 1000 may include base station 105-*d*, which may be an example of a wireless device 600, a wireless device 700, or a base station 105 described above with reference to FIGS. 1-8. Base station 105-*d* may include a base station CB level HARQ module 1010, which may be an example of a CB level HARQ module 610 described with reference to FIGS. 6-7. Base station 105-*d* may also include components for bi-directional voice and data communications including components for transmitting communications and components for receiving communications. For example, base station 105-*d* may communicate bi-directionally with UE 115-*e* or UE 115-*f*.

In some cases, base station 105-*d* may have one or more wired backhaul links. Base station 105-*d* may have a wired backhaul link (e.g., S1 interface, etc.) to the core network 130. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communication module 1025. In some examples, base station communication module 1025 may provide an X2 interface within an LTE/LTE-A wireless communication network technology to provide communication between some of the base stations 105. In some examples, base station 105-*d* may communicate with other base stations through core network 130. In some cases, base station 105-*d* may communicate with the core network 130 through network communications module 1030.

The base station 105-*d* may include a processor 1005, memory 1015 (including software (SW) 1020), transceiver modules 1035, and antenna(s) 1040, which each may be in communication, directly or indirectly, with one another (e.g., over bus system 1045). The transceiver modules 1035 may be configured to communicate bi-directionally, via the antenna(s) 1040, with the UEs 115, which may be multi-mode devices. The transceiver module 1035 (or other components of the base station 105-*d*) may also be configured to communicate bi-directionally, via the antennas 1040, with one or more other base stations (not shown). The transceiver module 1035 may include a modem configured to modulate the packets and provide the modulated packets to the antennas 1040 for transmission, and to demodulate packets received from the antennas 1040. The base station 105-*d* may include multiple transceiver modules 1035, each with one or more associated antennas 1040. The transceiver module may be an example of a combined receiver 605 and transmitter 615 of FIG. 6.

The memory 1015 may include RAM and ROM. The memory 1015 may also store computer-readable, computer-executable software code 1020 containing instructions that are configured to, when executed, cause the processor 1005 to perform various functions described herein (e.g., CB level HARQ, selecting coverage enhancement techniques, call processing, database management, message routing, etc.). Alternatively, the software 1020 may not be directly executable by the processor 1005 but be configured to cause the computer, e.g., when compiled and executed, to perform functions described herein. The processor 1005 may include an intelligent hardware device, e.g., a CPU, a microcontroller, an ASIC, etc. The processor 1005 may include various special purpose processors such as encoders, queue processing modules, base band processors, radio head controllers, digital signal processor (DSPs), and the like.

The base station communications module 1025 may manage communications with other base stations 105. The communications management module may include a controller or scheduler for controlling communications with UEs 115 in cooperation with other base stations 105. For example, the base station communications module 1025 may coordinate scheduling for transmissions to UEs 115 for various interference mitigation techniques such as beamforming or joint transmission.

Figure 11:
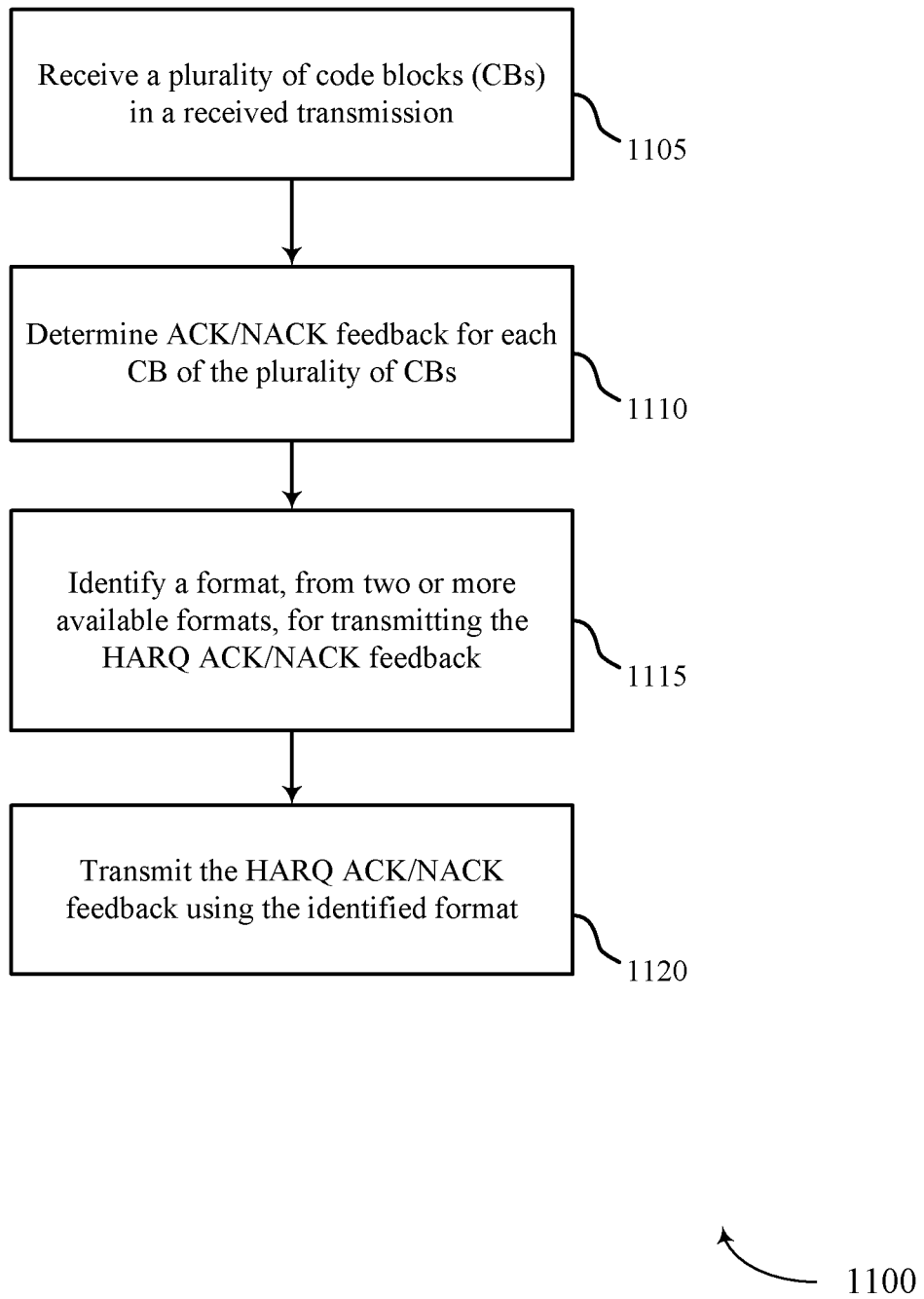
FIG. 11 shows a flowchart illustrating a method for CB level HARQ in accordance with various aspects of the present disclosure.

FIG. 11 shows a flowchart illustrating a method 1100 for CB level HARQ in accordance with various aspects of the present disclosure. The operations of method 1100 may be implemented by a wireless device, including a UE 115 or a base station 105, or its components, which may include wireless device 600 or wireless device 700, as described with reference to FIGS. 1-10. For example, the operations of method 1100 may be performed by the CB level HARQ module 610 as described with reference to FIGS. 6-8. In some examples, the wireless device may execute a set of codes to control the functional elements to perform the functions described below. Additionally or alternatively, the wireless device may perform aspects the functions described below using special-purpose hardware.

At block 1105, the wireless device may receive a plurality of code blocks (CBs) in a received transmission as described above with reference to FIGS. 2-5. In certain examples, the operations of block 1105 may be performed by the receiver 605 as described above with reference to FIG. 6-7.

At block 1110, the wireless device may determine ACK/NACK feedback for each CB of the plurality of CBs as described above with reference to FIGS. 2-5. In certain examples, the operations of block 1110 may be performed by the CB level HARQ module 610 as described above with reference to FIG. 6-8.

At block 1115, the wireless device may identify a format, from two or more available formats, for transmitting the HARQ ACK/NACK feedback as described above with reference to FIGS. 2-5. In certain examples, the operations of block 1115 may be performed by the CB level HARQ module 610 as described above with reference to FIG. 6-8.

At block 1120, the wireless device may transmit the HARQ ACK/NACK feedback using the identified format as described above with reference to FIGS. 2-5. In certain examples, the operations of block 1120 may be performed by the transmitter 615 as described above with reference to FIG. 6-7.

Figure 12:
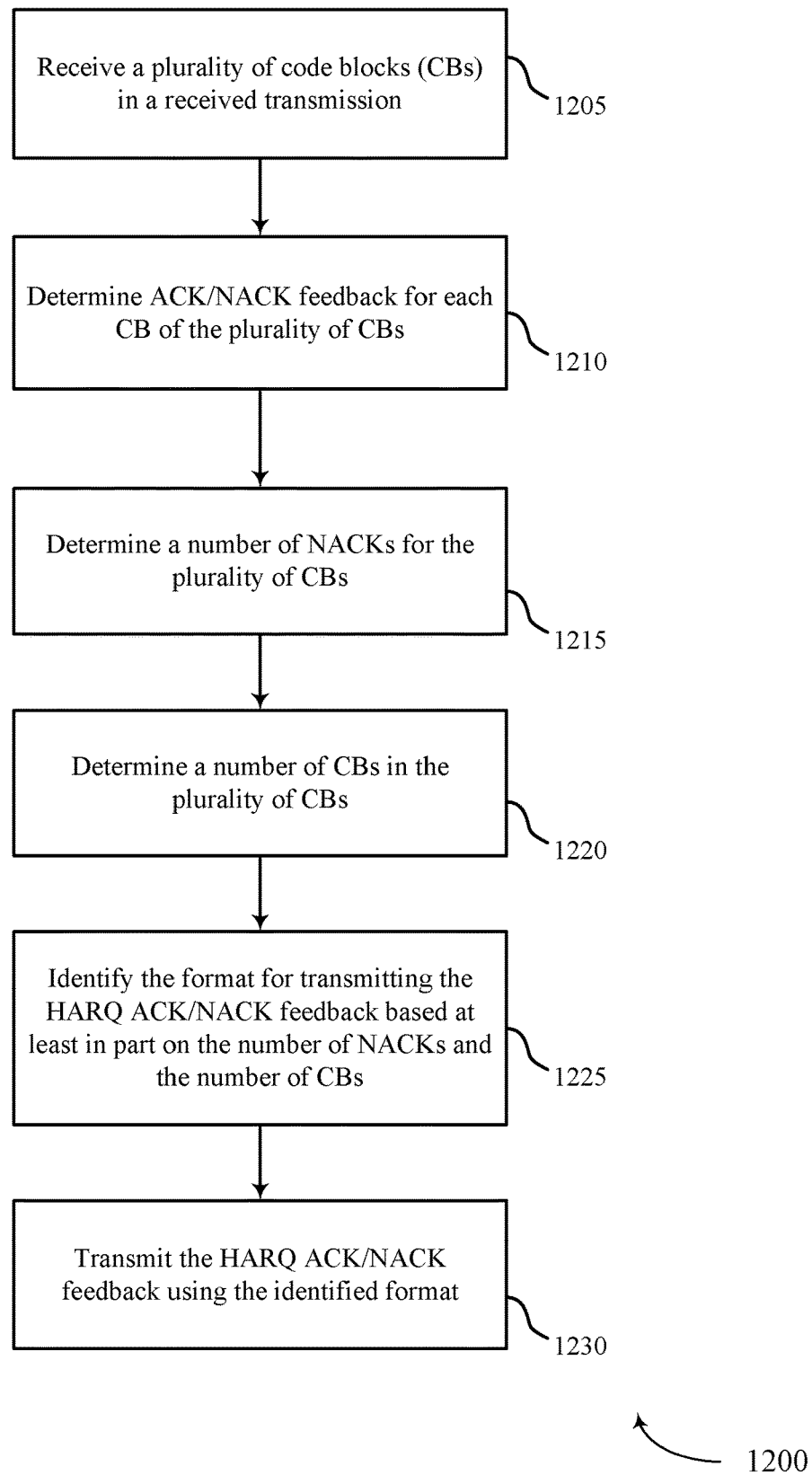
FIG. 12 shows a flowchart illustrating a method for CB level HARQ in accordance with various aspects of the present disclosure.

FIG. 12 shows a flowchart illustrating a method 1200 for CB level HARQ in accordance with various aspects of the present disclosure. The operations of method 1200 may be implemented by a wireless device, including a UE 115 or a base station 105, or its components, which may include wireless device 600 or wireless device 700, as described with reference to FIGS. 1-10. For example, the operations of method 1200 may be performed by the CB level HARQ module 610 as described with reference to FIGS. 6-8. In some examples, the wireless device may execute a set of codes to control the functional elements of the device to perform the functions described below. Additionally or alternatively, the wireless device may perform aspects the functions described below using special-purpose hardware. The method 1200 may also incorporate aspects of method 1100 of FIG. 11.

At block 1205, the wireless device may receive a plurality of code blocks (CBs) in a received transmission as described above with reference to FIGS. 2-5. In certain examples, the operations of block 1205 may be performed by the receiver 605 as described above with reference to FIG. 6-7.

At block 1210, the wireless device may determine ACK/NACK feedback for each CB of the plurality of CBs as described above with reference to FIGS. 2-5. In certain examples, the operations of block 1210 may be performed by the CB level HARQ module 610 as described above with reference to FIG. 6-8.

At block 1215, the wireless device may determine a number of NACKs for the plurality of CBs as described above with reference to FIGS. 2-5. In certain examples, the operations of block 1215 may be performed by the CB level HARQ module 610 as described above with reference to FIG. 6-8.

At block 1220, the wireless device may determine a number of CBs in the plurality of CBs as described above with reference to FIGS. 2-5. In certain examples, the operations of block 1220 may be performed by the CB level HARQ module 610 as described above with reference to FIG. 6-8

At block 1225, the wireless device may identify the format for transmitting the HARQ ACK/NACK feedback based at least in part on the number of NACKs and the number of CBs as described above with reference to FIGS. 2-5. In certain examples, the operations of block 1225 may be performed by the transmitter 615 as described above with reference to FIG. 6-7.

At block 1230, the wireless device may transmit the HARQ ACK/NACK feedback using the identified format as described above with reference to FIGS. 2-5. In certain examples, the operations of block 1230 may be performed by the transmitter 615 as described above with reference to FIG. 6-7.

Figure 13:
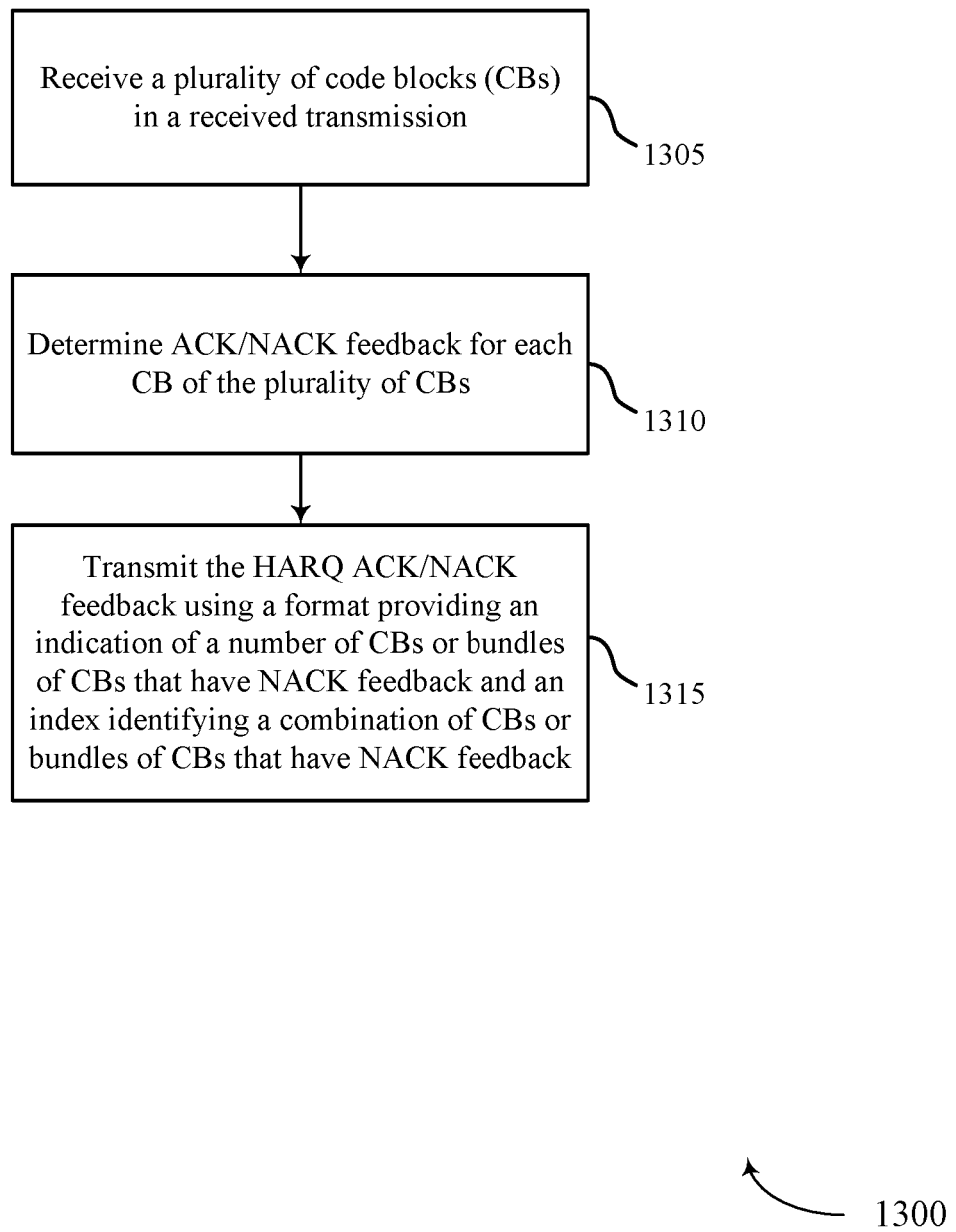
FIG. 13 shows a flowchart illustrating a method for CB level HARQ in accordance with various aspects of the present disclosure.

FIG. 13 shows a flowchart illustrating a method 1300 for CB level HARQ in accordance with various aspects of the present disclosure. The operations of method 1300 may be implemented by a wireless device, including a UE 115 or a base station 105, or its components, which may include wireless device 600 or wireless device 700, as described with reference to FIGS. 1-10. For example, the operations of method 1300 may be performed by the CB level HARQ module 610 as described with reference to FIGS. 6-8. In some examples, a wireless device may execute a set of codes to control the functional elements to perform the functions described below. Additionally or alternatively, the wireless device may perform aspects the functions described below using special-purpose hardware. The method 1300 may also incorporate aspects of methods 1100 or 1200 of FIGS. 11 and 12.

At block 1305, the wireless device may receive a plurality of code blocks (CBs) in a received transmission as described above with reference to FIGS. 2-5. In certain examples, the operations of block 1305 may be performed by the receiver 605 as described above with reference to FIG. 6-7.

At block 1310, the wireless device may determine ACK/NACK feedback for each CB of the plurality of CBs as described above with reference to FIGS. 2-5. In certain examples, the operations of block 1310 may be performed by the CB level HARQ module 610 as described above with reference to FIG. 6-8.

At block 1315, the wireless device may transmit the HARQ ACK/NACK feedback using a format providing an indication of a number of CBs or bundles of CBs that have NACK feedback and an index identifying a combination of CBs or bundles of CBs that have NACK feedback as described above with reference to FIGS. 2-5. In certain examples, the operations of block 1315 may be performed by the transmitter 615 as described above with reference to FIG. 6-7.

Figure 14:
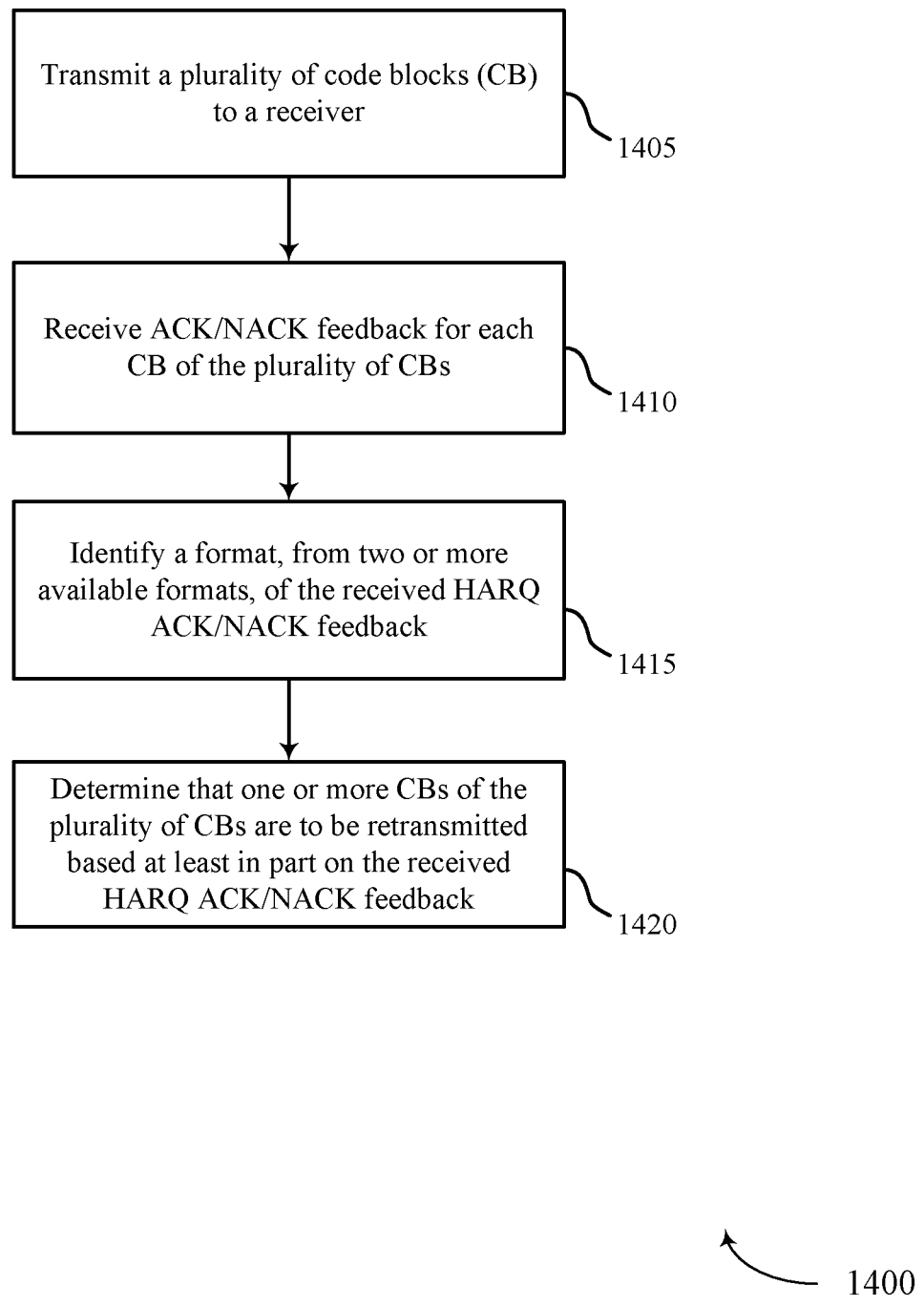
FIG. 14 shows a flowchart illustrating a method for CB level HARQ in accordance with various aspects of the present disclosure.

FIG. 14 shows a flowchart illustrating a method 1400 for CB level HARQ in accordance with various aspects of the present disclosure. The operations of method 1400 may be implemented by a wireless device, including a UE 115 or a base station 105, or its components, which may include wireless device 600 or wireless device 700, as described with reference to FIGS. 1-10. For example, the operations of method 1400 may be performed by the CB level HARQ module 610 as described with reference to FIGS. 6-8. In some examples, a wireless device may execute a set of codes to control the functional elements to perform the functions described below. Additionally or alternatively, the wireless device may perform aspects the functions described below using special-purpose hardware.

At block 1405, the wireless device may transmit a plurality of code blocks (CB) to a receiver as described above with reference to FIGS. 2-5. In certain examples, the operations of block 1405 may be performed by the transmitter 615 as described above with reference to FIG. 6-7.

At block 1410, the wireless device may receive ACK/NACK feedback for each CB of the plurality of CBs as described above with reference to FIGS. 2-5. In certain examples, the operations of block 1410 may be performed by the CB level HARQ module 610 as described above with reference to FIG. 6-8.

At block 1415, the wireless device identify a format, from two or more available formats, of the received HARQ ACK/NACK feedback as described above with reference to FIGS. 2-5. In certain examples, the operations of block 1415 may be performed by the CB level HARQ module 610 as described above with reference to FIG. 6-8.

At block 1420, the wireless device may determine that one or more CBs of the plurality of CBs are to be retransmitted based at least in part on the received HARQ ACK/NACK feedback as described above with reference to FIGS. 2-5. In certain examples, the operations of block 1420 may be performed by the CB level HARQ module 610 as described above with reference to FIG. 6-8.

At block 1425, the wireless device may identify the format for transmitting the HARQ ACK/NACK feedback based at least in part on the number of NACKs and the number of CBs as described above with reference to FIGS. 2-5. In certain examples, the operations of block 1425 may be performed by the transmitter 615 as described above with reference to FIG. 6-7.

Figure 15:
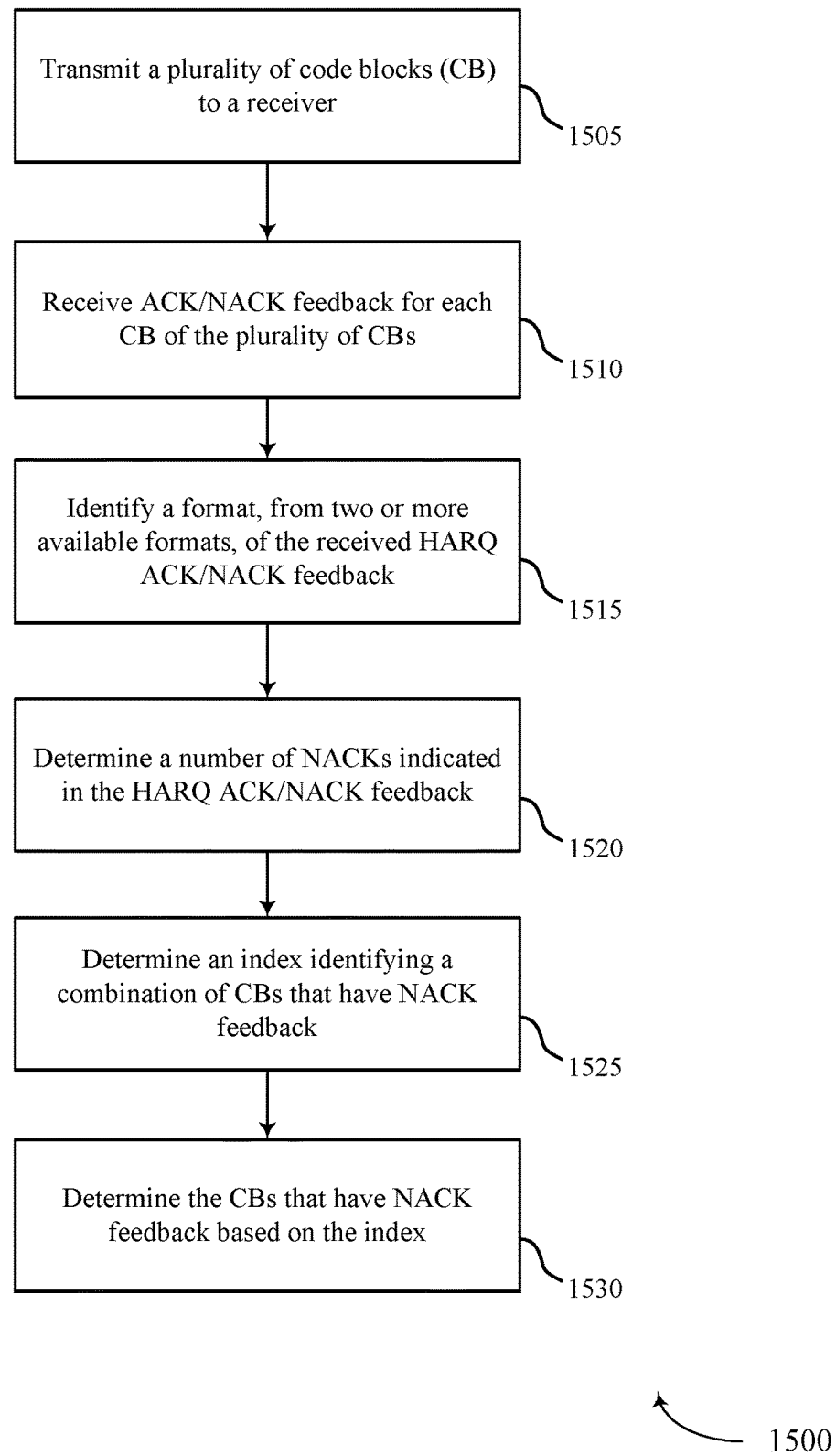
FIG. 15 shows a flowchart illustrating a method for CB level HARQ in accordance with various aspects of the present disclosure.

FIG. 15 shows a flowchart illustrating a method 1500 for CB level HARQ in accordance with various aspects of the present disclosure. The operations of method 1500 may be implemented by a wireless device, including a UE 115 or a base station 105, or its components, which may include wireless device 600 or wireless device 700, as described with reference to FIGS. 1-8. For example, the operations of method 1500 may be performed by the CB level HARQ module 610 as described with reference to FIGS. 6-8. In some examples, a wireless device may execute a set of codes to control the functional elements of the device to perform the functions described below. Additionally or alternatively, the wireless device may perform aspects the functions described below using special-purpose hardware. The method 1500 may also incorporate aspects of method 1400 of FIG. 14.

At block 1505, the wireless device may transmit a plurality of code blocks (CB) to a receiver as described above with reference to FIGS. 2-5. In certain examples, the operations of block 1505 may be performed by the transmitter 615 as described above with reference to FIG. 6-7.

At block 1510, the wireless device may receive ACK/NACK feedback for each CB of the plurality of CBs as described above with reference to FIGS. 2-5. In certain examples, the operations of block 1510 may be performed by the CB level HARQ module 610 as described above with reference to FIG. 6-8.

At block 1515, the wireless device identify a format, from two or more available formats, of the received HARQ ACK/NACK feedback as described above with reference to FIGS. 2-5. In certain examples, the operations of block 1515 may be performed by the CB level HARQ module 610 as described above with reference to FIG. 6-8.

At block 1520, the wireless device may determine a number of NACKs indicated in the HARQ ACK/NACK feedback as described above with reference to FIGS. 2-5. In certain examples, the operations of block 1520 may be performed by the CB level HARQ module 610 as described above with reference to FIG. 6-8.

At block 1525, the wireless device may determine an index identifying a combination of CBs that have NACK feedback as described above with reference to FIGS. 2-5. In certain examples, the operations of block 1525 may be performed by the CB level HARQ module 610 as described above with reference to FIG. 6-8.

At block 1530, the wireless device may determine the CBs that have NACK feedback based on the index as described above with reference to FIGS. 2-5. In certain examples, the operations of block 1530 may be performed by the CB level HARQ module 610 as described above with reference to FIG. 6-8.

Figure 16:
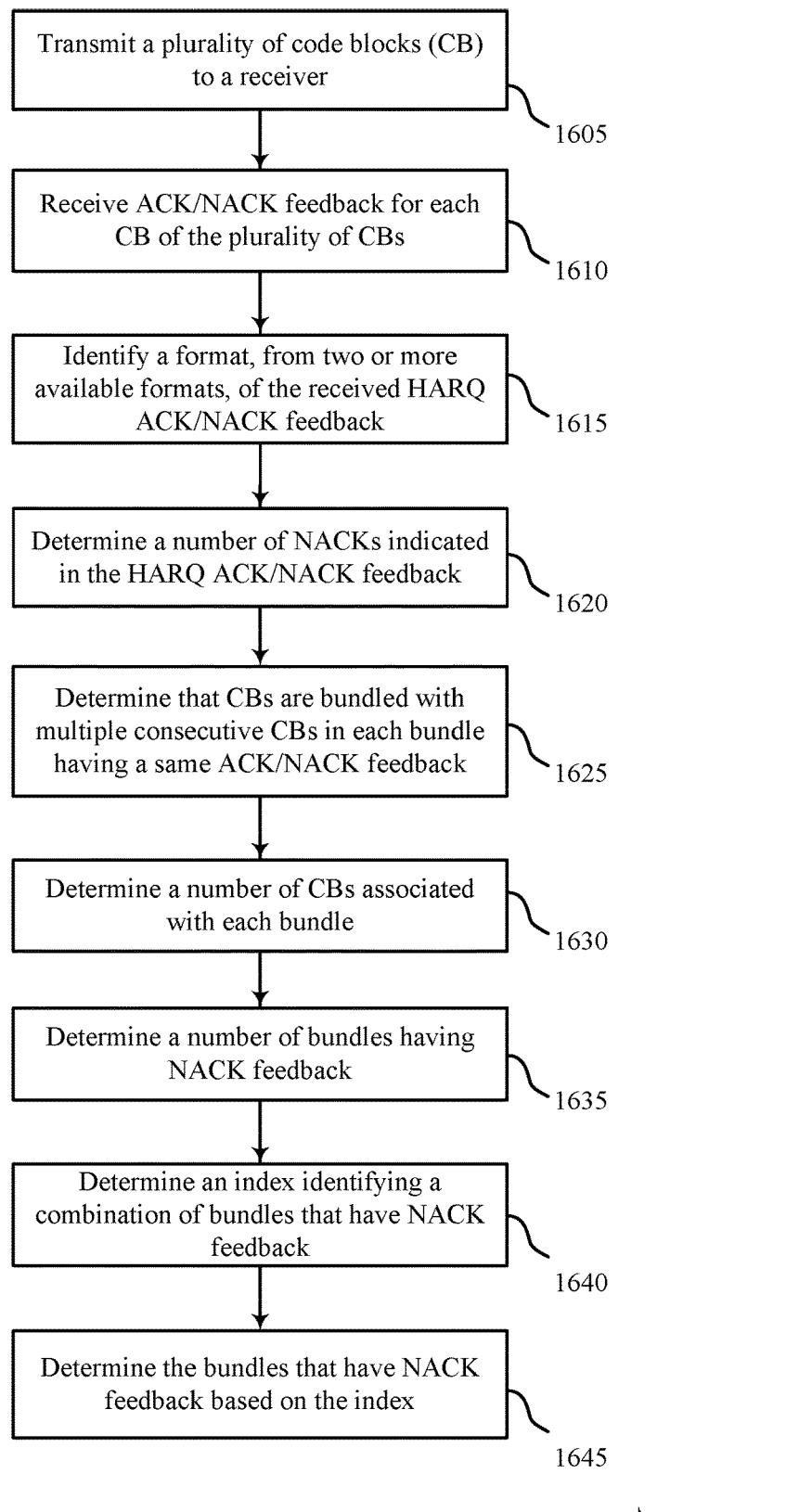
FIG. 16 shows a flowchart illustrating a method for CB level HARQ in accordance with various aspects of the present disclosure.

FIG. 16 shows a flowchart illustrating a method 1600 for CB level HARQ in accordance with various aspects of the present disclosure. The operations of method 1600 may be implemented by a wireless device, including a UE 115 or a base station 105, or its components, which may include wireless device 600 or wireless device 700, as described with reference to FIGS. 1-8. For example, the operations of method 1600 may be performed by the CB level HARQ module 610 as described with reference to FIGS. 5-8. In some examples, a wireless device may execute a set of codes to control the functional elements of the device to perform the functions described below. Additionally or alternatively, the wireless device may perform aspects the functions described below using special-purpose hardware. The method 1600 may also incorporate aspects of methods 1400 or 1600 of FIGS. 14 and 15.

At block 1605, the wireless device may transmit a plurality of code blocks (CB) to a receiver as described above with reference to FIGS. 2-5. In certain examples, the operations of block 1605 may be performed by the transmitter 615 as described above with reference to FIG. 6-7.

At block 1610, the wireless device may receive ACK/NACK feedback for each CB of the plurality of CBs as described above with reference to FIGS. 2-5. In certain examples, the operations of block 1610 may be performed by the CB level HARQ module 610 as described above with reference to FIG. 6-8.

At block 1615, the wireless device identify a format, from two or more available formats, of the received HARQ ACK/NACK feedback as described above with reference to FIGS. 2-5. In certain examples, the operations of block 1615 may be performed by the CB level HARQ module 610 as described above with reference to FIG. 6-8.

At block 1620, the wireless device may determine a number of NACKs indicated in the HARQ ACK/NACK feedback as described above with reference to FIGS. 2-5. In certain examples, the operations of block 1620 may be performed by the CB level HARQ module 610 as described above with reference to FIG. 6-8.

At block 1625, the wireless device may determine that CBs are bundled with multiple consecutive CBs in each bundle having a same ACK/NACK feedback as described above with reference to FIGS. 2-5. In certain examples, the operations of block 1625 may be performed by the CB level HARQ module 610 as described above with reference to FIG. 6-8.

At block 1630, the wireless device may determine a number of CBs associated with each bundle as described above with reference to FIGS. 2-5. In certain examples, the operations of block 1630 may be performed by the CB level HARQ module 610 as described above with reference to FIG. 6-8.

At block 1635, the wireless device may determine a number of bundles having NACK feedback as described above with reference to FIGS. 2-5. In certain examples, the operations of block 1635 may be performed by the CB level HARQ module 610 as described above with reference to FIG. 6-8.

At block 1640, the wireless device may determine an index identifying a combination of bundles that have NACK feedback as described above with reference to FIGS. 2-5. In certain examples, the operations of block 1640 may be performed by the CB level HARQ module 610 as described above with reference to FIG. 6-8.

At block 1645, the wireless device may determine the bundles that have NACK feedback based on the index as described above with reference to FIGS. 2-5. In certain examples, the operations of block 1645 may be performed by the CB level HARQ module 610 as described above with reference to FIG. 6-8.

Thus, methods 1100, 1200, 1300, 1400, 1500, and 1600 may provide for CB level HARQ. It should be noted that methods 1100, 1200, 1300, 1400, 1500, and 1600 describe possible implementation, and that the operations and the steps may be rearranged or otherwise modified such that other implementations are possible. In some examples, aspects from two or more of the methods 1100, 1200, 1300, 1400, 1500, and 1600 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of communication at a wireless device, comprising:
   receiving a plurality of code blocks (CBs) in a received transmission;
   determining hybrid automatic repeat request (HARQ) acknowledgment/negative acknowledgment (ACK/NACK) feedback for each CB of the plurality of CBs;
   identifying a format, from two or more available formats, for transmitting the HARQ ACK/NACK feedback, wherein the identified format is dynamically selected based at least in part on a number of CBs having a NACK feedback; and
   transmitting the HARQ ACK/NACK feedback using the identified format.

2. The method of claim 1, wherein identifying the format for transmitting the HARQ ACK/NACK feedback comprises:
   determining a number of NACKs for the plurality of CBs;
   determining a number of CBs in the plurality of CBs; and
   identifying the format for transmitting the HARQ ACK/NACK feedback based at least in part on the number of NACKs and the number of CBs.

3. The method of claim 2, wherein the two or more available formats comprise an uncompressed format and one or more compressed formats.

4. The method of claim 3, wherein the uncompressed format is identified as the format for transmitting the HARQ ACK/NACK feedback when the number of CBs is less than a threshold number of CBs, and wherein one of the one or more compressed format is identified as the format for transmitting the HARQ ACK/NACK feedback when the number of CBs is meets or exceeds the threshold number of CBs.

5. The method of claim 4, wherein the threshold number of CBs is determined based on available resources for transmission of the HARQ ACK/NACK feedback.

6. The method of claim 1, wherein the two or more available formats for transmitting the HARQ ACK/NACK feedback comprise:
a first format having a dedicated bit associated with each CB; and
a second format providing an indication of a number of CBs that have NACK feedback and an index identifying a combination of CBs that have NACK feedback.

7. The method of claim 6, wherein the second format includes a plurality of bits that are less than the number of CBs.

8. The method of claim 6, wherein the two or more available formats for transmitting the HARQ ACK/NACK feedback further comprise:
a third format providing an HARQ ACK/NACK feedback for one or more bundles of CBs.

9. The method of claim 8, wherein the third format provides an indication of a number of CBs in each bundle of CBs, a number of bundles of CBs in which CBs in the bundle have NACK feedback, and an index identifying a combination of bundles of CBs that have NACK feedback.

10. The method of claim 6, wherein the two or more available formats for transmitting the HARQ ACK/NACK feedback further comprise:
a fourth format having a dedicated bit associated with two or more bundles of CBs.

11. The method of claim 1, wherein the format for transmitting the HARQ ACK/NACK feedback is semi-statically selected based at least in part on channel conditions associated with the transmission of the plurality of CBs.

12. The method of claim 11, wherein the format for transmitting the HARQ ACK/NACK feedback is signaled using radio resource control (RRC) signaling.

13. The method of claim 11, wherein selecting the format further comprises:
selecting the format from a group of formats that are signaled using RRC signaling.

14. The method of claim 1, wherein the transmission further comprises:
an indication of the selected format.

15. The method of claim 1, further comprising:
selecting a first format from the two or more available formats; and
determining for the first format whether the number of CBs is less than a threshold number of CBs, wherein the identifying of the format is based at least in part on whether the number of CBs is less than the threshold number of CBs for the selected first format.

16. The method of claim 15, further comprising:
selecting a second format from the two or more available formats; and
determining that the number of CBs for the second format meets or exceeds the threshold number of CBs, wherein the identifying of the format occurs subsequent to the determining that the number of CBs for the second format meets or exceeds the CB threshold.

17. An apparatus for wireless communication at a wireless device, comprising:
means for receiving a plurality of code blocks (CBs) in a received transmission;
means for determining hybrid automatic repeat request (HARQ) acknowledgment/negative acknowledgment (ACK/NACK) feedback for each CB of the plurality of CBs;
means for identifying a format, from two or more available formats, for transmitting the HARQ ACK/NACK feedback, wherein the format for transmitting the HARQ ACK/NACK feedback is dynamically selected based at least in part on a number of CBs having a NACK feedback; and
means for transmitting the HARQ ACK/NACK feedback using the identified format.

18. The apparatus of claim 17, wherein the means for identifying the format for transmitting the HARQ ACK/NACK feedback comprises:
means for determining a number of NACKs for the plurality of CBs;
means for determining a number of CBs in the plurality of CBs; and
means for identifying the format for transmitting the HARQ ACK/NACK feedback based at least in part on the number of NACKs and the number of CBs.

19. The apparatus of claim 18, wherein the two or more available formats comprise an uncompressed format and one or more compressed formats.

20. The apparatus of claim 19, wherein the uncompressed format is identified as the format for transmitting the HARQ ACK/NACK feedback when the number of CBs is less than a threshold number of CBs, and wherein one of the one or more compressed format is identified as the format for transmitting the HARQ ACK/NACK feedback when the number of CBs is meets or exceeds the threshold number of CBs.

21. The apparatus of claim 20, wherein the threshold number of CBs is determined based on available resources for transmission of the HARQ ACK/NACK feedback.

22. The apparatus of claim 17, wherein the two or more available formats for transmitting the HARQ ACK/NACK feedback comprise:
a first format having a dedicated bit associated with each CB; and
a second format providing an indication of a number of CBs that have NACK feedback and an index identifying a combination of CBs that have NACK feedback.

23. The apparatus of claim 22, wherein the second format includes a plurality of bits that are less than the number of CBs.

24. The apparatus of claim 22, wherein the two or more available formats for transmitting the HARQ ACK/NACK feedback further comprise:
a third format providing an HARQ ACK/NACK feedback for one or more bundles of CBs.

25. The apparatus of claim 24, wherein the third format provides an indication of a number of CBs in each bundle of CBs, a number of bundles of CBs in which CBs in the bundle have NACK feedback, and an index identifying a combination of bundles of CBs that have NACK feedback.

26. The apparatus of claim 22, wherein the two or more available formats for transmitting the HARQ ACK/NACK feedback further comprise:
a fourth format having a dedicated bit associated with two or more bundles of CBs.

27. The apparatus of claim 17, wherein the format for transmitting the HARQ ACK/NACK feedback is semi-statically selected based at least in part on channel conditions associated with the transmission of the plurality of CBs.

28. The apparatus of claim 27, wherein the format for transmitting the HARQ ACK/NACK feedback is signaled using radio resource control (RRC) signaling.

29. The apparatus of claim 27, wherein selecting the format further comprises:
selecting the format from a group of formats that are signaled using RRC signaling.

30. The apparatus of claim 17, further comprising:
means for selecting a first format from the two or more available formats; and
means for determining for the first format whether the number of CBs is less than a threshold number of CBs, wherein the identifying of the format is based at least in part on whether the number of CBs is less than the threshold number of CBs for the selected first format.

31. The apparatus of claim 30, further comprising:
means for selecting a second format from the two or more available formats; and
means for determining that the number of CBs for the second format meets or exceeds the threshold number of CBs, wherein the identifying of the format occurs subsequent to the determining that the number of CBs for the second format meets or exceeds the CB threshold.

32. The apparatus of claim 17, wherein the means for transmitting further comprises:
an indication of the selected format.

33. An apparatus for communication at a wireless device, comprising:
a processor;
memory in electronic communication with the processor; and
instructions stored in the memory; wherein the instructions are executable by the processor to:
receive a plurality of code blocks (CBs) in a received transmission;
determine hybrid automatic repeat request (HARQ) acknowledgment/negative acknowledgment (ACK/NACK) feedback for each CB of the plurality of CBs;
identify a format, from two or more available formats, for transmitting the HARQ ACK/NACK feedback, wherein the format for transmitting the HARQ ACK/NACK feedback is dynamically selected based at least in part on a number of CBs having a NACK feedback; and
transmit the HARQ ACK/NACK feedback using the identified format.

34. The apparatus of claim 33, wherein the instructions are further executable by the processor to:
determine a number of NACKs for the plurality of CBs;
determine a number of CBs in the plurality of CBs; and
identify the format for transmitting the HARQ ACK/NACK feedback based at least in part on the number of NACKs and the number of CBs.

35. The apparatus of claim 34, wherein the two or more available formats comprise an uncompressed format and one or more compressed formats.

36. The apparatus of claim 35, wherein the uncompressed format is identified as the format for transmitting the HARQ ACK/NACK feedback when the number of CBs is less than a threshold number of CBs, and wherein one of the one or more compressed format is identified as the format for transmitting the HARQ ACK/NACK feedback when the number of CBs is meets or exceeds the threshold number of CBs.

37. The apparatus of claim 36, wherein the threshold number of CBs is determined based on available resources for transmission of the HARQ ACK/NACK feedback.

38. The apparatus of claim 33, wherein the two or more available formats for transmitting the HARQ ACK/NACK feedback comprise:
a first format having a dedicated bit associated with each CB; and
a second format providing an indication of a number of CBs that have NACK feedback and an index identifying a combination of CBs that have NACK feedback.

39. The apparatus of claim 38, wherein the second format includes a plurality of bits that are less than the number of CBs.

40. The apparatus of claim 38, wherein the two or more available formats for transmitting the HARQ ACK/NACK feedback further comprise:
a third format providing an HARQ ACK/NACK feedback for one or more bundles of CBs.

41. The apparatus of claim 40, wherein the third format provides an indication of a number of CBs in each bundle of CBs, a number of bundles of CBs in which CBs in the bundle have NACK feedback, and an index identifying a combination of bundles of CBs that have NACK feedback.

42. The apparatus of claim 38, wherein the two or more available formats for transmitting the HARQ ACK/NACK feedback further comprise:
a fourth format having a dedicated bit associated with two or more bundles of CBs.

43. The apparatus of claim 33, wherein the format for transmitting the HARQ ACK/NACK feedback is semi-statically selected based at least in part on channel conditions associated with the transmission of the plurality of CBs.

44. The apparatus of claim 43, wherein the format for transmitting the HARQ ACK/NACK feedback is signaled using radio resource control (RRC) signaling.

45. The apparatus of claim 43, wherein selecting the format further comprises:
selecting the format from a group of formats that are signaled using RRC signaling.

46. The apparatus of claim 33, wherein the instructions are further executable by the processor to:
select a first format from the two or more available formats; and
determine for the first format whether the number of CBs is less than a threshold number of CBs, wherein the identifying of the format is based at least in part on whether the number of CBs is less than the threshold number of CBs for the selected first format.

47. The apparatus of claim 46, wherein the instructions are further executable by the processor to:
select a second format from the two or more available formats; and
determine that the number of CBs for the second format meets or exceeds the threshold number of CBs, wherein the identifying of the format occurs subsequent to the determining that the number of CBs for the second format meets or exceeds the CB threshold.

48. The apparatus of claim 33, wherein the transmission further comprises:
an indication of the selected format.

49. A non-transitory computer-readable medium storing code for communication at a wireless device, the code comprising instructions executable to:
receive a plurality of code blocks (CBs) in a received transmission;
determine hybrid automatic repeat request (HARQ) acknowledgment/negative acknowledgment (ACK/NACK) feedback for each CB of the plurality of CBs;
identify a format, from two or more available formats, for transmitting the HARQ ACK/NACK feedback, wherein the format for transmitting the HARQ ACK/NACK feedback is dynamically selected based at least in part on a number of CBs having a NACK feedback; and
transmit the HARQ ACK/NACK feedback using the identified format.

50. The non-transitory computer-readable medium of claim 49, wherein the instructions executable to identify the format for transmitting the HARQ ACK/NACK feedback comprise instructions executable to:
determine a number of NACKs for the plurality of CBs;
determine a number of CBs in the plurality of CBs; and
identify the format for transmitting the HARQ ACK/NACK feedback based at least in part on the number of NACKs and the number of CBs.

51. The non-transitory computer-readable medium of claim 50, wherein the two or more available formats comprise an uncompressed format and one or more compressed formats.

52. The non-transitory computer-readable medium of claim 51, wherein the uncompressed format is identified as the format for transmitting the HARQ ACK/NACK feedback when the number of CBs is less than a threshold number of CBs, and wherein one of the one or more compressed format is identified as the format for transmitting the HARQ ACK/NACK feedback when the number of CBs is meets or exceeds the threshold number of CBs.

53. The non-transitory computer-readable medium of claim 52, wherein the threshold number of CBs is determined based on available resources for transmission of the HARQ ACK/NACK feedback.

54. The non-transitory computer-readable medium of claim 49, wherein the two or more available formats for transmitting the HARQ ACK/NACK feedback comprise:
a first format having a dedicated bit associated with each CB; and
a second format providing an indication of a number of CBs that have NACK feedback and an index identifying a combination of CBs that have NACK feedback.

55. The non-transitory computer-readable medium of claim 54, wherein the second format includes a plurality of bits that are less than the number of CBs.

56. The non-transitory computer-readable medium of claim 54, wherein the two or more available formats for transmitting the HARQ ACK/NACK feedback further comprise:
a third format providing an HARQ ACK/NACK feedback for one or more bundles of CBs.

57. The non-transitory computer-readable medium of claim 56, wherein the third format provides an indication of a number of CBs in each bundle of CBs, a number of bundles of CBs in which CBs in the bundle have NACK feedback, and an index identifying a combination of bundles of CBs that have NACK feedback.

58. The non-transitory computer-readable medium of claim 54, wherein the two or more available formats for transmitting the HARQ ACK/NACK feedback further comprise:
a fourth format having a dedicated bit associated with two or more bundles of CBs.

59. The non-transitory computer-readable medium of claim 49, wherein the format for transmitting the HARQ ACK/NACK feedback is semi-statically selected based at least in part on channel conditions associated with the transmission of the plurality of CBs.

60. The non-transitory computer-readable medium of claim 59, wherein the format for transmitting the HARQ ACK/NACK feedback is signaled using radio resource control (RRC) signaling.

61. The non-transitory computer-readable medium of claim 59, wherein the instructions executable to select the format comprise instructions executable to:
select the format from a group of formats that are signaled using RRC signaling.

62. The non-transitory computer-readable medium of claim 49, wherein the transmission further comprises:
an indication of the selected format.

63. The non-transitory computer-readable medium of claim 49, wherein the instructions are executable to:
select a first format from the two or more available formats; and
determine for the first format whether the number of CBs is less than a threshold number of CBs, wherein the identifying of the format is based at least in part on whether the number of CBs is less than the threshold number of CBs for the selected first format.

64. The non-transitory computer-readable medium of claim 63, wherein the instructions are executable to:
select a second format from the two or more available formats; and
determine that the number of CBs for the second format meets or exceeds the threshold number of CBs, wherein the identifying of the format occurs subsequent to the determining that the number of CBs for the second format meets or exceeds the CB threshold.

* * * * *